(12) United States Patent
Lee et al.

(10) Patent No.: US 12,541,458 B2
(45) Date of Patent: Feb. 3, 2026

(54) OPERATING METHOD OF STORAGE CONTROLLER, STORAGE DEVICE, AND OPERATING METHOD OF STORAGE DEVICE

(71) Applicant: Samsung Electronics Co., Ltd., Suwon-si (KR)

(72) Inventors: Chonghyun Lee, Suwon-si (KR); Minkyu Kim, Suwon-si (KR); Seokha Shin, Suwon-si (KR); Youngjin Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/794,433

(22) Filed: Aug. 5, 2024

(65) Prior Publication Data

US 2025/0086113 A1  Mar. 13, 2025

(51) Int. Cl.
| | | |
|---|---|---|
| *G06F 12/08* | (2016.01) | |
| *G06F 12/0804* | (2016.01) | |
| *G06F 12/0862* | (2016.01) | |
| *G06F 12/123* | (2016.01) | |

(52) U.S. Cl.
CPC ...... *G06F 12/0862* (2013.01); *G06F 12/0804* (2013.01); *G06F 12/123* (2013.01)

(58) Field of Classification Search
CPC ............. G06F 12/0862; G06F 12/0804; G06F 12/0868; G06F 12/0888; G06F 12/123; G06F 12/127; G06F 2212/1016; G06F 2212/1024; G06F 2212/214; G06F 2212/502; G06F 2212/6026
See application file for complete search history.

(56) References Cited

U.S. PATENT DOCUMENTS

| | | | |
|---|---|---|---|
| 6,728,837 B2 * | 4/2004 | Wilkes .................. | G06F 12/123 711/E12.071 |
| 9,098,418 B2 | 8/2015 | Kannan et al. | |
| 9,983,997 B2 | 5/2018 | Pan | |
| 10,146,448 B2 | 12/2018 | Kotte et al. | |
| 10,509,732 B2 | 12/2019 | Moyer | |
| 11,379,375 B1 | 7/2022 | Gottin et al. | |
| 2015/0286571 A1 | 10/2015 | Cain, III et al. | |
| 2020/0210333 A1 * | 7/2020 | Ramini ............ | G06F 16/24552 |

FOREIGN PATENT DOCUMENTS

KR  4432102 A1 * 11/2023

* cited by examiner

*Primary Examiner* — Tracy C Chan
(74) *Attorney, Agent, or Firm* — Fish & Richardson P.C.

(57) ABSTRACT

An operating method of a storage controller includes, storing data and a source type of the data in a cache memory, when a cache hit occurs, determining a source type of data corresponding to the cache hit and updating a hit count corresponding to the determined source type among a plurality of hit counts, determining a source type with a dominant hit rate among a plurality of source types based on the plurality of hit counts, operating in a first mode when a result of the determining indicates that the source type with the dominant hit rate is a first type, and operating in a second mode when the result of the determining indicates that the source type with the dominant hit rate is a second type.

20 Claims, 19 Drawing Sheets

FIG. 9

| POLICY TABLE | |
|---|---|
| MODE 1 | VICTIM POLICY 1 |
| MODE 2 | VICTIM POLICY 2 |

OPERATING METHOD OF STORAGE CONTROLLER, STORAGE DEVICE, AND OPERATING METHOD OF STORAGE DEVICE

CROSS-REFERENCE TO RELATED APPLICATION

This application is based on and claims priority under 35 U.S.C. § 119 to Korean Patent Application Nos. 10-2023-0122078, filed on Sep. 13, 2023 and 10-2023-0162731, filed on Nov. 21, 2023, in the Korean Intellectual Property Office, the disclosures of which are incorporated by reference herein in their entireties.

BACKGROUND

The inventive concepts relate to semiconductor memories, and more specifically, to an operating methods of a storage controller, a storage devices, and operating methods of the storage device.

Semiconductor memories are classified into volatile memory devices, such as static random-access memory (SRAM), dynamic random-access memory (DRAM), etc., in which stored data is lost when power supply thereto is blocked, and non-volatile memory devices, such as flash memory devices, phase-change random access memory (PRAM), magnetoresistive random-access memory (MRAM), resistive random-access memory (RRAM), ferroelectric random-access memory (FRAM), etc., in which the stored data is retained even when the power supply thereto is blocked.

Because physical resources of storage devices are limited, performance deteriorates depending on the characteristics of workloads. Storage devices include a cache memory. Storage devices may perform one of a plurality of cache policies to efficiently use the cache memory. However, storage devices fixedly use one cache policy, making it difficult to guarantee minimum performance for various workloads. A storage device capable of changing cache policies depending on the characteristics of workloads is required.

SUMMARY

The inventive concepts provide operating methods of a storage controller with improved performance, storage devices, and operating methods of the storage device.

According to an example embodiment of the inventive concepts, an operating method of a storage controller may include storing data and a source type of the data in a cache memory, when a cache hit occurs, determining a source type of data corresponding to the cache hit and updating a hit count corresponding to the determined source type among a plurality of hit counts, determining a source type with a dominant hit rate among a plurality of source types based on the plurality of hit counts, operating in a first mode when a results of the determining indicates that the source type with the dominant hit rate is a first type among the plurality of source types is dominant, and operating in a second mode when the result of the determining indicates that the source type with the dominant hit rate is a second type.

According to an example embodiment of the inventive concepts, an operating method of a storage device including a storage controller and a non-volatile memory (NVM) device may include outputting, by the NVM device, data to the storage controller, storing, by the storage controller, the data output from the NVM and a source type of the data in a cache memory, when a cache hit occurs, determining, by the storage controller, a source type of data corresponding to the cache hit and updating a hit count corresponding to the determined source type among a plurality of hit counts, operating, by the storage controller, in a mode corresponding to a dominant source type from among a plurality of source types, and performing, by the storage controller, a cache policy corresponding to the mode.

According to an example embodiment of the inventive concepts, a storage device may include an non-volatile memory (NVM) device, and a storage controller configured to control the NVM device, wherein the storage controller includes a cache memory, and a cache manager configured to read data from the NVM device, store the data and a source type of the data in the cache memory, the storage controller is configured to, when a cache hit occurs, determine a source type of data corresponding to the cache hit and update a hit count corresponding to the determined source type among a plurality of hit counts, and the storage controller is configured to, determine a dominant source type with a dominant hit rate among a plurality of source types based on the plurality of hit counts and operate in a mode corresponding to the dominant source type.

BRIEF DESCRIPTION OF THE DRAWINGS

Example embodiments will be more clearly understood from the following detailed description taken in conjunction with the accompanying drawings in which:

FIG. 9 is a diagram showing a policy table according to an example embodiment;

DETAILED DESCRIPTION

Hereinafter, some example embodiments of the inventive concepts will be described clearly and in detail so that ordinary sill in the art may easily practice the inventive concepts.

As used herein, expressions such as "at least one of," when preceding a list of elements, modify the entire list of elements and do not modify the individual elements of the list. Thus, for example, both "at least one of A, B, or C" and "at least one of A, B, and C" mean either A, B, C or any combination thereof. Likewise, A and/or B means A, B, or A and B.

Figure 1:
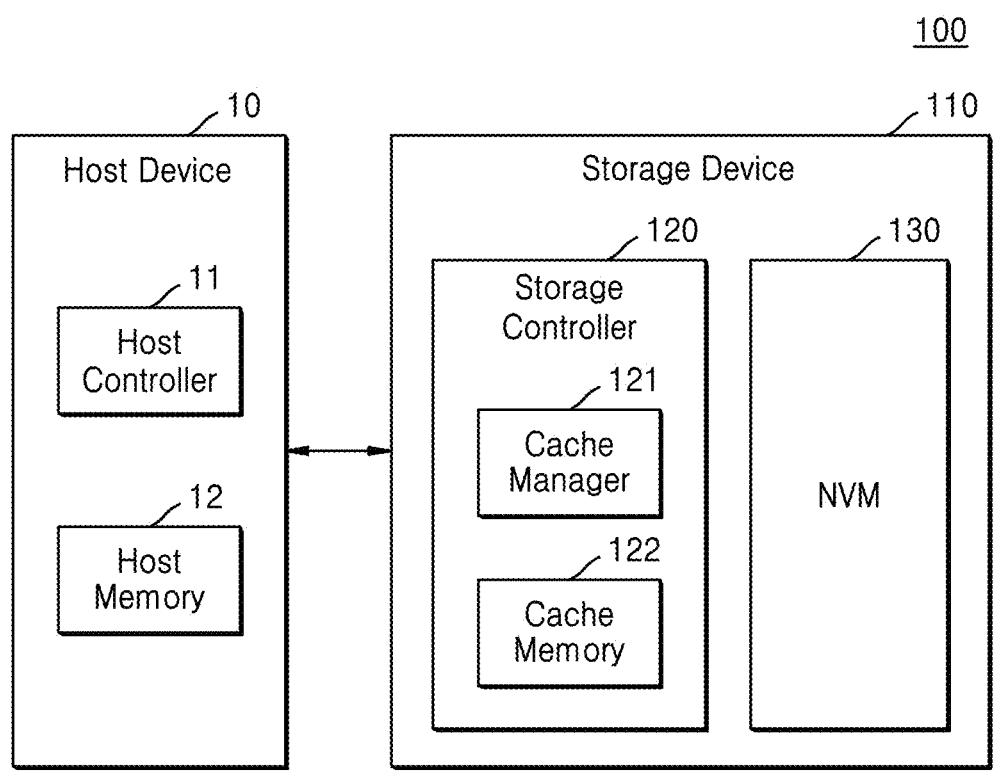
FIG. 1 is a block diagram showing a storage system according to an example embodiment.

FIG. 1 is a block diagram showing a storage system 100 according to an example embodiment.

Referring to FIG. 1, the storage system 100 may include a host device 10 and a storage device 110. The storage system 100 may be implemented as, for example, an electronic device such as a personal computer (PC), a laptop computer, a server, a workstation, a mobile phone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book.

The host device 10 may control data processing operations, for example, a data read operation or a data write operation, on the storage device 110. The host device 10 may refer to a data processing device capable of processing data, such as a central processing unit (CPU), a processor, a microprocessor, or an application processor (AP). The host device 10 may run an operating system (OS) and/or various applications.

For example, the host device 10 may include a host controller 11 and a host memory 12. The host controller 11 may be a device configured to control the overall operation of the host device 10 or to control the storage device 110 from the host device 10 side. The host memory 12 may be a buffer memory, a cache memory, or an operating memory used in the host device 10.

In an example embodiment, the host memory 12 may function as a buffer memory temporarily storing data to be transmitted to the storage device 110 or data transmitted from the storage device 110. The host device 10 may transmit a request to the storage device 110 and receive a response from the storage device 110. For example, when the request is a write request, the request may include write data. For example, when the request is a read request, a response to the request may include read data.

The storage device 110 may operate by the control of the host device 10. The storage device 110 may include a storage controller 120 and a non-volatile memory (NVM) device 130. The storage controller 120 may perform various management operations to efficiently use the NVM device 130. The NVM device 130 may include a plurality of NVMs.

The storage device 110 may receive the request from the host device 10 and transmit the response to the host device 10. For example, when the request is a write request, the storage controller 120 may control the NVM device 130 to write data to the NVM device 130 in response to the write request from the host device 10. For example, when the request is a read request, the storage controller 120 may control the NVM device 130 to read data stored in the NVM device 130 in response to the read request from the host device 10.

The storage controller 120 may be configured to control the NVM device 130. For example, the storage controller 120 may store data in the NVM device 130 or read the data stored in the NVM device 130 by the control of the host device 10. In an example embodiment, the storage controller 120 may perform various maintenance operations to improve the performance or reliability of the NVM device 130, regardless of the control of the host device 10.

In an example embodiment, the storage controller 120 may be configured to communicate with an external host based on a predetermined host interface. The predetermined host interface may include at least one of various host interfaces such as Universal Serial Bus (USB), multimedia card (MMC), peripheral component interconnection (PCI), PCI-express (PCI-E), Advanced Technology Attachment (ATA), Serial-ATA (SATA), Parallel-ATA (PATA), small computer small interface (SCSI), enhanced small disk interface (ESDI), Integrated Drive Electronics (IDE), Mobile Industry Processor Interface (MIPI), NVM-express (NVMc), Compute eXpress Link (CXL) interface, etc.

In an example embodiment, the storage controller 120 may be configured to communicate with the NVM device 130 through a predetermined memory interface. The predetermined memory interface may include at least one of various flash memory interfaces such as a toggle NAND interface, Open NAND Flash Interface (ONFI), etc.

The NVM device 130 may operate by the control of the storage controller 120. For example, the NVM device 130 may store data or output the stored data by the control of the storage controller 120. In an example embodiment, the NVM device 130 may be a NAND flash memory, but the scope of the inventive concepts is not limited thereto.

When the NVM device 130 includes a flash memory, the flash memory may include a 2D NAND memory array or a 3D (or vertical) NAND (VNAND) memory array. As another example, the storage device 110 may include other types of NVMs. For example, the storage device 110 may include magnetic RAM (MRAM), spin-transfer torque MRAM, conductive bridging RAM (CBRAM), ferroelectric RAM (FeRAM), phase RAM (PRAM), resistive RAM (RRAM), and/or other types of memories.

The storage controller 120 may include a cache manager 121 and a cache memory 122. The cache manager 121 may be implemented as software, hardware, or a combination of software and hardware.

The cache memory 122 may be configured to store the write data received from the host device 10 or the data read from the NVM device 130 by the control of the storage controller 120. For example, the cache memory 122 may be a buffer memory and may be referred to as a read cache. Hereinafter, it is assumed that the buffer memory is SRAM. However, the scope of the inventive concepts is not limited thereto. For example, the buffer memory may include high-speed random access memory such as Dynamic RAM (DRAM), Synchronous DRAM (SDRAM), etc. In some example embodiments, the buffer memory may include NVM such as read only memory (ROM), programmable ROM (PROM), electrically programmable ROM (EPROM), electrically erasable and programmable ROM (EEPROM), a flash memory device, PRAM, MRAM, RRAM, FRAM, Thyristor RAM (TRAM), etc.

In an example embodiment, the cache memory 122 may be configured to store a variety of information necessary for the storage device 110 to operate. For example, the cache memory 122 may be configured to store metadata used by the storage controller 120. In some example embodiments, the cache memory 122 may be configured to store a variety of data used or managed by the storage controller 120.

The cache manager 121 may perform a monitoring operation on the cache memory 122. The cache manager 121 may perform the monitoring operation for a predetermined time (or reference time). The cache manager 121 may perform the monitoring operation to count hit counts with respect to each of a plurality of source types.

In an example embodiment, when loading data into the cache memory 122, the storage controller 120 may record a cause of occurrence. That is, when storing data in the cache memory 122, the storage controller 120 may store a source type ST. For example, in case of a cache miss, the storage controller 120 may load data from the NVM device 130. The storage controller 120 may load data into the cache memory 122 and store the source type ST corresponding to the data.

In an example embodiment, the cache manager 121 may distinguish the source type ST according to a cause of generation of cache. The source type ST may indicate a cause of generation of data loaded into the cache memory 122. In an example embodiment, the source type ST may include a first type TY1 and a second type TY2. The first type TY1 may indicate the host device 10, and the second type TY2 may indicate pre-fetch. That is, the first type TY1 may indicate the type of data loaded by an input/output request received from an external host device, and the second type TY2 may indicate the type of data loaded by a pre-fetch operation.

The cache manager 121 may perform a cache adjustment operation. The cache manager 121 may calculate a hit rate according to the source type ST based on the hit count. The cache manager 121 may determine a cache mode based on the hit rate and operate in the determined cache mode. The cache manager 121 may perform a cache policy corresponding to the cache mode.

Because the size of the cache memory 122 of the storage controller 120 is limited, a fixed cache management policy suitable for all workloads of the host device 10 is realistically impossible. Accordingly, the storage controller 120 may provide improved performance by controlling cache management policies according to the characteristics of workloads. The storage controller 120 may use information that may be easily collected internally to predict workload and dynamically apply an optimal cache policy corresponding thereto.

Figure 2:
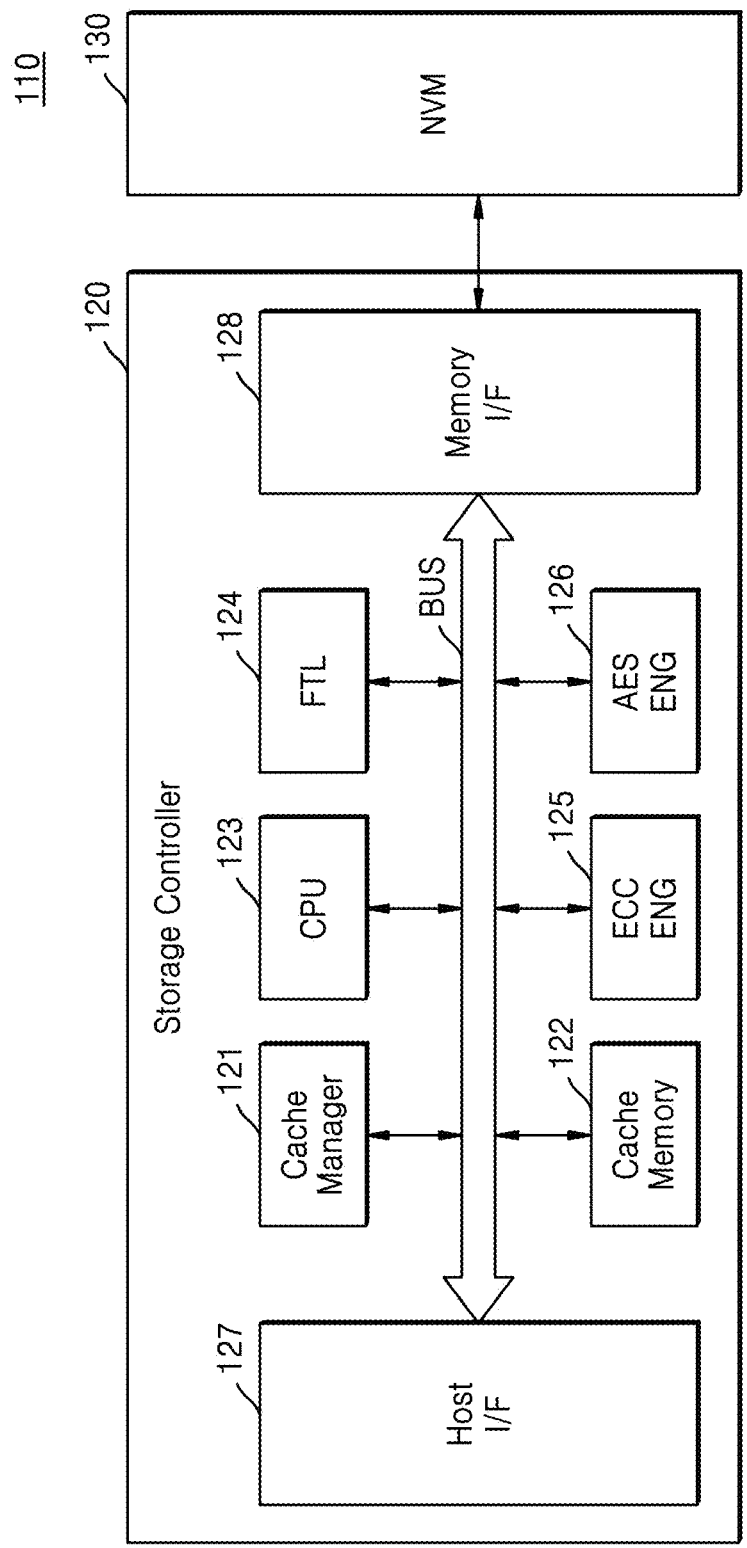
FIG. 2 is a block diagram showing a storage device according to an example embodiment.

FIG. 2 is a block diagram showing the storage device 110 according to an example embodiment.

Referring to FIG. 2, the storage device 110 may include the storage controller 120 and the NVM device 130. For convenience of explanation, detailed descriptions of the components described above are omitted.

The storage controller 120 may include the cache manager 121, the cache memory 122, a CPU 123, a flash translation layer (FTL) 124, an error correction code (ECC) engine 125, an advanced encryption standard (AES) engine 126, a host interface circuit 127, a NVM interface circuit 128, and a bus.

The storage controller 120 may further include a working memory (not shown) into which the FTL 124 is loaded and may control data write and read operations on the NVM device 130 by the CPU 123 executing the FTL 124.

In an example embodiment, the CPU 123 may be implemented as a multi-core processor, for example, a dual-core processor or a quad-core processor. The cache manager 121 and the FTL 124 may be loaded into an operating memory of the storage controller 120. For example, the operating memory may be implemented as volatile memory such as SRAM, DRAM, etc., or NVM such as flash memory, PRAM, etc.

The FTL 124 may perform several functions such as address mapping, wear-leveling, and garbage collection. Address mapping is an operation of changing a logical address received from the host device 10 into a physical address used to actually store data in the NVM device 130. Wear-leveling is technology to alleviate or prevent excessive deterioration of a specific block by ensuring that blocks in the NVM device 130 are used uniformly and, for example, may be implemented through firmware technology of balancing erase counts of physical blocks. Garbage collection is technology for securing usable capacity within the NVM device 130 by copying valid data of a block to a new block and then erasing the existing block.

The ECC engine 125 may perform an ECC function on read data read from the NVM device 130. For example, the ECC engine 125 may generate parity bits with respect to write data to be written to the NVM device 130, and the parity bits generated as above may be stored in the NVM device 130 together with the write data. When reading data from the NVM device 130, the ECC engine 125 may correct an error in the read data by using the parity bits read from the NVM device 130 along with the read data and may output the read data from which the error has been corrected.

In an example embodiment, the ECC engine 125 may correct the error by using soft decoding, a low density parity check (LDPC) code, a Bose-Chaudhuri-Hocquenghem (BCH) code, a Turbo code, a Reed-Solomon code, a convolutional code, a recursive systematic code (RSC), coded modulation such as Block coded modulation (BCM), trellis-coded modulation (TCM), etc., or other methods.

The AES engine 126 may perform at least one of an encryption operation or a decryption operation on data input to the storage controller 120 by using a symmetric-key algorithm.

The host interface circuit 127 may transmit and receive packets to and from the host device 10. A packet transmitted from the host device 10 to the host interface circuit 127 may include a command, a request, or data to be written to the NVM device 130, and a packet transmitted from the host interface circuit 127 to the host device 10 may include a response to the command or data read from the NVM device 130.

The NVM interface circuit 128 may transmit data to be written to the NVM device 130 or receive data read from the NVM device 130. The NVM interface circuit 128 may be implemented to comply with a standard protocol such as Toggle or ONFI.

The storage controller 120 may perform a pre-fetch operation (or read ahead operation). The pre-fetch operation may not be an operation instructed by the host device 10 but may be an operation determined and performed by the storage device 110. For example, the pre-fetch operation may be an operation of loading data that has not been requested by the host device 10 into the cache memory 122. In an example embodiment, the storage controller 120 may load data predicted to be requested by the host device 10 later from the NVM device 130 to the cache memory 122 by referring to a request, a command, an address, additional information, or internal settings provided from the host device 10.

For example, the storage device 110 may receive a read request from the host device 10. The storage controller 120 may read data requested by the host device 10 from the NVM device 130 and transmit the data to the host device 10. In addition, the storage controller 120 may determine whether to perform the pre-fetch operation separately from the data requested by the host device 10. The storage controller 120 may determine whether to load data that the host device 10 is expected to request later into the cache memory 122 by referring to the request and the address provided by the host device 10.

In an example embodiment, the storage controller 120 may determine whether to perform the pre-fetch operation based on a read pattern requested from the host device 10. When a logical address of the data requested by the host device 10 is a random pattern, the storage controller 120 may not perform the pre-fetch operation. On the other hand, when the logical address of the data requested by the host device 10 is a sequential pattern, the storage controller 120 may perform the pre-fetch operation. The storage controller 120 may load data of a logical address following the currently requested logical address into the cache memory 122. In other words, the storage controller 120 may read data predicted to be requested consecutively to data corresponding to the read request from the NVM device 130.

In an example embodiment, when storing data in the cache memory 122, the storage controller 120 may determine the source type ST based on a subject of the data request. For example, in response to the request from the host device 10, the storage controller 120 may determine the first type TY1 when loading data from the NVM device 130 to the cache memory 122. For example, in response to the pre-fetch operation, the storage controller 120 may determine the second type TY2 when loading data from the NVM device 130 to the cache memory 122.

In an example embodiment, the storage controller 120 may include a source type table STT. The source type table STT may include the source type ST of cache data, with respect to data (e.g., cache data) stored in the cache memory 122. The storage controller 120 may store and update the source type ST with respect to the cache data in the source type table STT. When the cache data is loaded at the request of the host device 10, the storage controller 120 may store the source type ST of the cache data as the first type TY1 in the source type table STT. When the cache data is loaded by the pre-fetch operation, the storage controller 120 may store the source type ST of the cache data as the second type TY2 in the source type table STT. For example, the storage controller 120 may store the source type table STT in the cache memory 122 or a separate buffer memory.

In an example embodiment, when a cache hit occurs, the storage controller 120 may determine the source type ST in which a hit occurred and count the number of occurrences of the cache hit. In addition, the storage controller 120 may store whether the cache hit has occurred when the cache hit occurs. The storage controller 120 may store whether a cache hit of data has occurred through a hit flag HF.

In an example embodiment, the storage controller 120 may include a hit flag table HFT. The hit flag table HFT may include the hit flag HF of the cache data in relation to the data (e.g., cache data) stored in the cache memory 122. The storage controller 120 may store and update the hit flag HF with respect to the cache data in the hit flag table HFT. The hit flag HF may indicate a first value (e.g., '0') or a second value (e.g., '1'). The first value (e.g., '0') may indicate a state in which no cache hit occurred during the reference time, and the second value (e.g., '1') may indicate a state in which the cache hit occurred during the reference time. When storing the cache data in the cache memory 122, the storage controller 120 may initialize the hit flag HF of the cache data. The storage controller 120 may set the hit flag HF of the cache data to the first value (e.g., '0'). When the cache hit occurs, the storage controller 120 may set the hit flag HF of the cache data to the second value (e.g., '1').

In an example embodiment, the cache memory 122 may include a plurality of cache sets. A cache set may include a cache line and a cache entry. The cache entry may include a valid bit, a dirty bit, a tag, the source type ST, the hit flag HF, etc. The cache line may indicate the cache data loaded from the NVM device 130. The valid bit may be a bit indicating whether data is updated from the NVM device 130 to the corresponding cache set. The dirty bit may be a bit indicating whether an update occurs after the data is stored in the corresponding cache set. The tag may indicate address information about cache data stored in the cache set. The source type ST may indicate a cause of generation of the cache data stored in the cache set. The hit flag HF may indicate whether a hit occurs in the cache data stored in the corresponding cache set.

Hereinafter, for convenience of explanation, it is assumed that the source type table STT and the hit flag table HFT are used instead of the cache entry. However, the scope of the inventive concepts is not limited thereto.

The cache manager 121 may perform a cache policy corresponding to a mode. In an example embodiment, the cache policy may include a first cache policy and a second cache policy. For example, the cache manager 121 may perform the first cache policy corresponding to a first mode in the first mode and a second cache policy corresponding to a second mode in the second mode.

In an example embodiment, the cache policy may include a victim selection method, a pre-fetch offset, and a pre-fetch size. For example, the first cache policy may include a first victim selection method, a first pre-fetch offset, and a first pre-fetch size. The second cache policy may include a second victim selection method, a second pre-fetch offset, and a second pre-fetch size.

The storage controller 120 may select a victim entry from the cache memory 122. For example, the storage controller 120 may select one victim entry (or victim cache) from among a plurality of entries (or caches) of the cache memory 122. The storage controller 120 may select the victim entry by using least recently used (LRU), most recently used (MRU), first-in-first-out (FIFO), etc. That is, the victim selection method may be any one of LRU, MRU, and FIFO.

The storage controller 120 may further include a timer (not shown). The timer may be configured to count a predetermined time. For example, the timer may be configured to count the time elapsed from a specific time or a predetermined time period by counting a system clock or an operation clock. For example, the timer may be configured to count the reference time with respect to the cache manager 121. The reference time may refer to the predetermined time. When the timer with respect to the cache manager 121 expires (in other words, when the reference time has elapsed from the specific time), the cache manager 121 may calculate a cache hit rate and determine a cache policy based on the cache hit rate.

As described above, the storage controller 120 may perform a monitoring operation in the unit of the reference time and calculate the cache hit rate. The storage controller 120 may detect or predict the characteristics of workload based on the cache hit rate. The storage controller 120 may change the mode and the cache policy as the cache hit rate changes. That is, the storage controller 120 may change the cache policy when the read pattern of the workload changes. Accordingly, the storage device 110 may improve processing performance of a read request in various situations.

Figure 3:
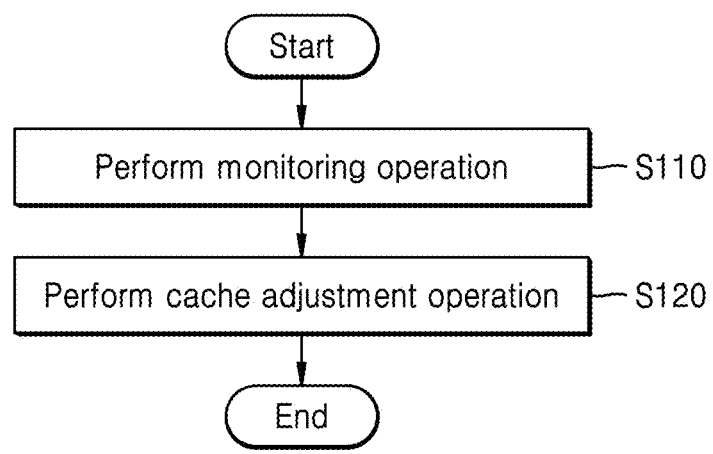
FIG. 3 is a flowchart showing an operating method of a storage controller according to an example embodiment.

FIG. 3 is a flowchart showing an operating method of the storage controller 120 according to an example embodiment.

Referring to FIGS. 1 and 3, in operation S110, the storage controller 120 may perform a monitoring operation. The storage controller 120 may monitor the cache memory 122. The storage controller 120 may perform the monitoring operation to monitor an input/output pattern of workload.

In an example embodiment, the monitoring operation may refer to a series of operations of collecting information or data used in a cache adjustment operation. For example, the storage controller 120 may determine the source type ST of data loaded into the cache memory 122 and store the determined source type ST. The storage controller 120 may determine the source type ST of data corresponding to a cache hit. The storage controller 120 may count the number of hits for each source type ST. That is, the storage controller 120 may update a hit count corresponding to the determined source type ST among a plurality of hit counts.

In an example embodiment, the storage controller 120 may perform the monitoring operation during a reference time. A timer of the storage controller 120 may transmit a signal to the cache manager 121 when the timer expires (or when the reference time has elapsed). The cache manager 121 may perform a cache adjustment operation in response to the signal.

In operation S120, the storage controller 120 may perform the cache adjustment operation. The storage controller 120 may adjust a cache policy based on information collected during the monitoring operation. The storage controller 120 may calculate a hit rate based on the hit count for each source type ST. That is, the storage controller 120 may determine the source type ST with a dominant hit rate among the plurality of source types ST based on the plurality of hit counts. The storage controller 120 may determine the cache mode based on the hit rate. The storage controller 120 may perform a cache policy corresponding to the cache mode. For example, the storage controller 120 may operate in the determined cache mode for a next reference time.

As described above, the storage controller 120 may divide workload types into specific modes depending on the dominant source type ST. That is, the storage controller 120 may determine the mode based on the hit rate. The storage controller 120 may improve performance by performing the cache policy corresponding to the mode.

Figure 4:
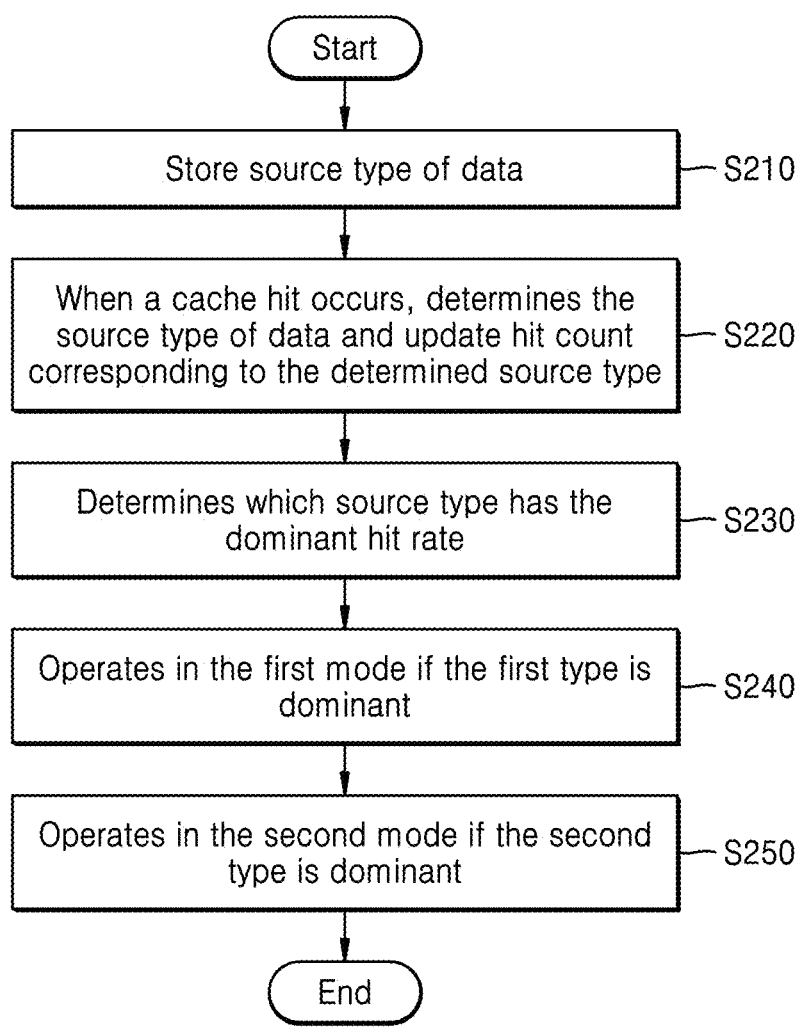
FIG. 4 is a flowchart showing an operating method of a storage controller according to an example embodiment.

FIG. 4 is a flowchart showing an operating method the storage controller 120 according to an example embodiment.

Referring to FIGS. 1, 3, and 4, operation S110 of FIG. 3 may include operations S210 and S220. Operation S120 may include operations S230 to S250. In operation S210, the storage controller 120 may store the source type ST of data. When storing data in the cache memory 122, the storage controller 120 may store the source type ST corresponding to the data. For example, when data is loaded into the cache memory 122 at the request of the host device 10, the cache manager 121 may store the source type ST of the data as the first type TY1. When data is loaded into the cache memory 122 through a pre-fetch operation, the cache manager 121 may store the source type ST of the data as the second type TY2. For example, the storage controller 120 may store the source type ST in relation to the data in the source type table STT. In some example embodiments, the storage controller 120 may store the source type ST in a cache entry corresponding to the data.

In operation S220, when a cache hit occurs, the storage controller 120 may determine the source type ST of the data corresponding to the cache hit and update a hit count corresponding to the determined source type ST. For example, when the cache hit occurs with respect to data corresponding to the first source type TY1, the cache manager 121 may update a first hit count HC1. The cache manager 121 may increase the first hit count HC1 by '1'. In some example embodiments, when the cache hit occurs with respect to data corresponding to the second source type TY2, the cache manager 121 may update a second hit count HC2. The cache manager 121 may increase the second hit count HC2 by '1'.

In operation S230, the storage controller 120 may determine the source type ST with a dominant hit rate. In an example embodiment, the cache manager 121 may calculate a hit rate based on a plurality of hit counts. The cache manager 121 may determine the source type ST with the dominant hit rate among the plurality of source types ST.

In operation S240, the storage controller 120 may operate in the first mode when the first type TY1 is dominant. When the cache manager 121 determines that the first type TY1 is dominant among the plurality of source types ST, the cache manager 121 may operate in a first mode corresponding to the first type TY1. The cache manager 121 may operate in the first mode with respect to a next reference time.

In operation S250, the storage controller 120 may operate in a second mode when the second type TY2 is dominant. When the cache manager 121 determines that the second type TY2 is dominant among the plurality of source types ST, the cache manager 121 may operate in a second mode corresponding to the second type TY2. The cache manager 121 may operate in the second mode with respect to the next reference time.

As described above, when storing data in the cache memory 122, the storage controller 120 may read data from the NVM device 130, store the data in the cache memory 122, and determine and store the source type ST of the data. When a cache hit occurs, the storage controller 120 may determine the source type ST of the data corresponding to the cache hit and update a hit count HC corresponding to the determined source type ST among a plurality of hit counts. The storage controller 120 may determine the source type ST with the dominant hit rate among the plurality of source types ST based on the plurality of hit counts HC and operate in a mode corresponding to the dominant source type ST. That is, the storage controller 120 according to the inventive concepts may dynamically manage a cache policy according to the characteristics of workload. Accordingly, a storage device with improved performance is provided.

Figure 5:
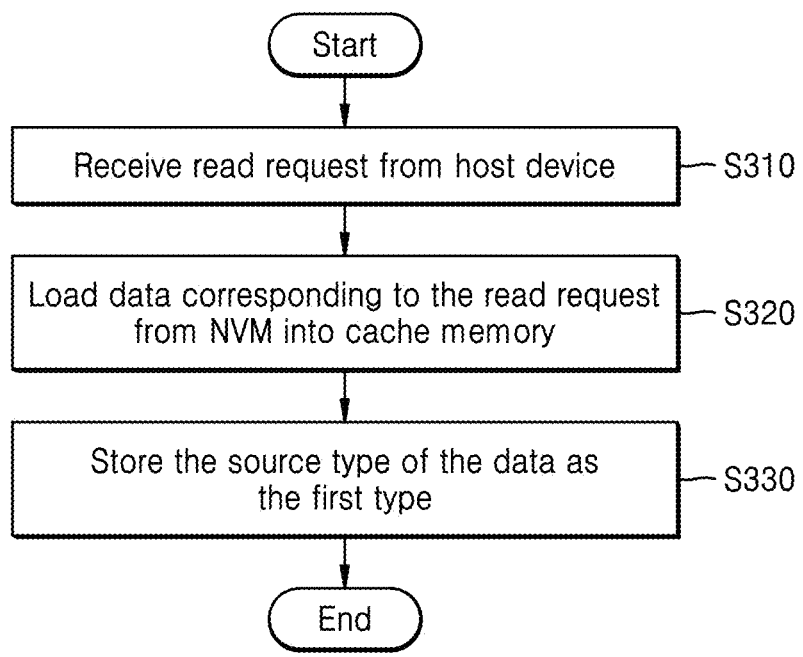
FIG. 5 is a flowchart showing operation S210 of FIG. 4 in more detail according to an example embodiment.

FIG. 5 is a flowchart showing operation S210 of FIG. 4 in more detail according to an example embodiment.

Referring to FIGS. 1, 4, and 5, operation S210 of FIG. 4 may include operations S310 to S330. In operation S310, the storage controller 120 may receive a read request from the host device 10. The read request may include a logical address.

In operation S320, the storage controller 120 may load data corresponding to the read request from the NVM device 130 to the cache memory 122. For example, the storage controller 120 may determine whether the data corresponding to the read request is stored in the cache memory 122. The storage controller 120 may determine whether a cache hit or a cache miss occurs. The cache hit may indicate a case where the data corresponding to the read request received from the host device 10 is stored in the cache memory 122. The cache miss may refer to a case where the data corresponding to the read request received from the host device 10 is not stored in the cache memory 122.

When the cache miss occurs, the storage controller 120 may load data corresponding to an address included in the read request from the NVM device 130 in response to the read request. The storage controller 120 may read the data corresponding to the read request from the NVM device 130 and store the read data in the cache memory 122. The storage controller 120 may convert the logical address included in the read request into a physical address. The storage controller 120 may transmit a read command including the physical address to the NVM device 130. The NVM device 130 may provide data corresponding to the physical address to the storage controller 120. The storage controller 120 may receive read data from the NVM device 130. The storage controller 120 may store the read data in the cache memory 122.

In operation S330, the storage controller 120 may store the source type ST of data as the first type TY1. The storage controller 120 may determine a cause of generation of the data stored in the cache memory 122. The storage controller 120 may determine that the data is loaded at the request of the host device 10. The storage controller 120 may store the source type ST of the data as the first type TY1. For example, the storage controller 120 may store the first type TY1 in relation to the data in the source type table STT. In some example embodiments, the storage controller 120 may set the source type ST of a cache entry corresponding to the data to the first type TY1.

In an example embodiment, the storage controller 120 may transmit the data loaded into the cache memory 122 to the host device 10. The storage controller 120 may transmit the data corresponding to the read request received from the host device 10 to the host device 10. In case of the cache miss, a read latency may increase compared to the cache hit. In the case of the cache hit, the data may be directly transmitted from the cache memory 122 to the host device 10, which may make the read latency shorter. In the case of the cache miss, the data may be loaded from the NVM device 130 into the cache memory 122 and the data may be transmitted from the cache memory 122 to the host device 10, which may make the read latency longer.

Figure 6:
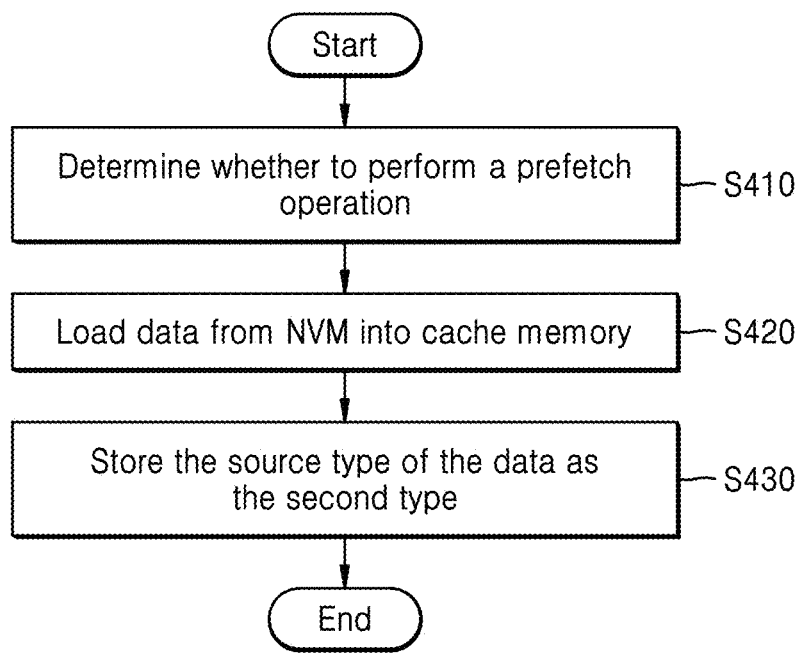
FIG. 6 is a flowchart showing operation S210 of FIG. 4 in more detail according to an example embodiment.

FIG. 6 is a flowchart showing operation S210 of FIG. 4 in more detail according to an example embodiment.

Referring to FIGS. 1, 4, and 6, operation S210 of FIG. 4 may include operations S410 to S430. In operation S410, the storage controller 120 may determine whether to perform a pre-fetch operation. For example, the storage controller 120 may perform the pre-fetch operation when the current read pattern is a sequential pattern. The storage controller 120 may determine whether to perform the pre-fetch operation by referring to not only an input/output pattern of data but also whether data corresponding to a specific logical address is frequently updated hot data. The storage controller 120 may determine whether to perform the pre-fetch operation by referring to additional information transmitted from the host device 10. That is, the storage controller 120 may determine whether to perform the pre-fetch operation by referring to additional information (a name space, a data tag, a task ID, a process ID, etc.) included in a command provided at a read request from the host device 10. The storage controller 120 may determine whether to perform the pre-fetch operation by referring to an internal setting, for example, an interleaving sequence executed on the NVM device 130.

In operation S420, the storage controller 120 may load data from the NVM device 130 to the cache memory 122. The storage controller 120 may determine to perform the pre-fetch operation. For example, the storage controller 120 may read data corresponding to an address predicted to be requested later from the NVM device 130 to the host device 10.

The storage controller 120 may transmit a read command including a physical address corresponding to a logical address different from the logical address requested by the host device 10 to the NVM device 130. The storage controller 120 may receive the data from the NVM device 130. The storage controller 120 may store the data in the cache memory 122.

In operation S430, the storage controller 120 may store the source type ST of the data as the second type TY2. The storage controller 120 may determine a cause of generation of the data stored in the cache memory 122. The storage controller 120 may determine that the data is loaded through the pre-fetch operation. The storage controller 120 may store the source type ST of the data as the second type TY2. For example, the storage controller 120 may store the second type TY2 in relation to the data in the source type table STT. In some example embodiments, the storage controller 120 may set the source type ST of a cache entry corresponding to the data to the second type TY2.

Figure 7:
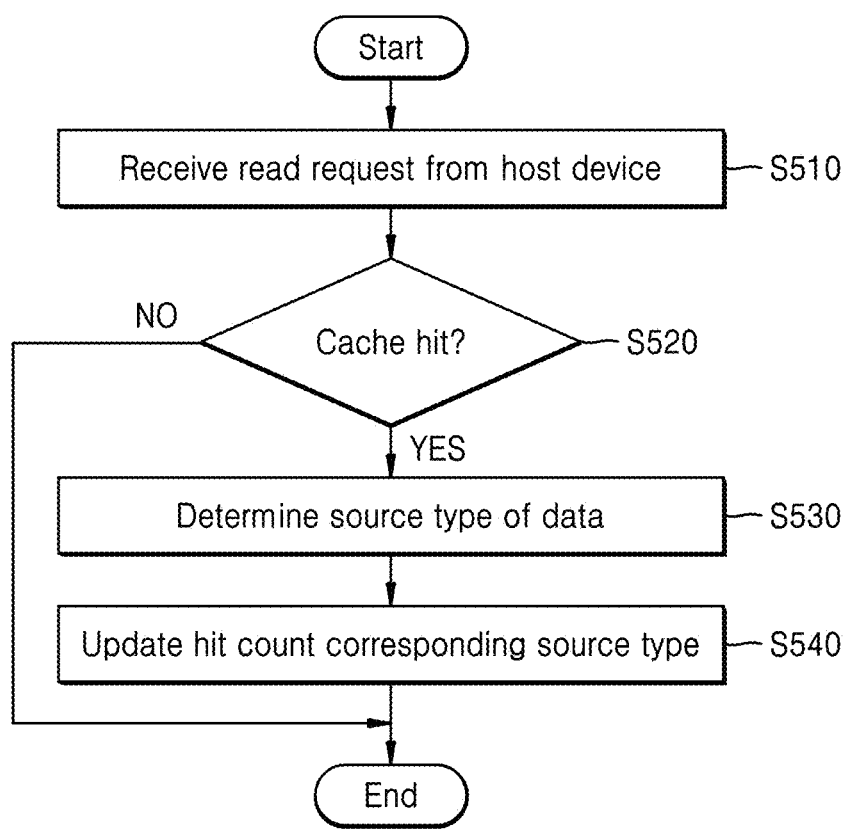
FIG. 7 is a flowchart showing operation S220 of FIG. 4 in more detail according to an example embodiment.
Figure 8A:
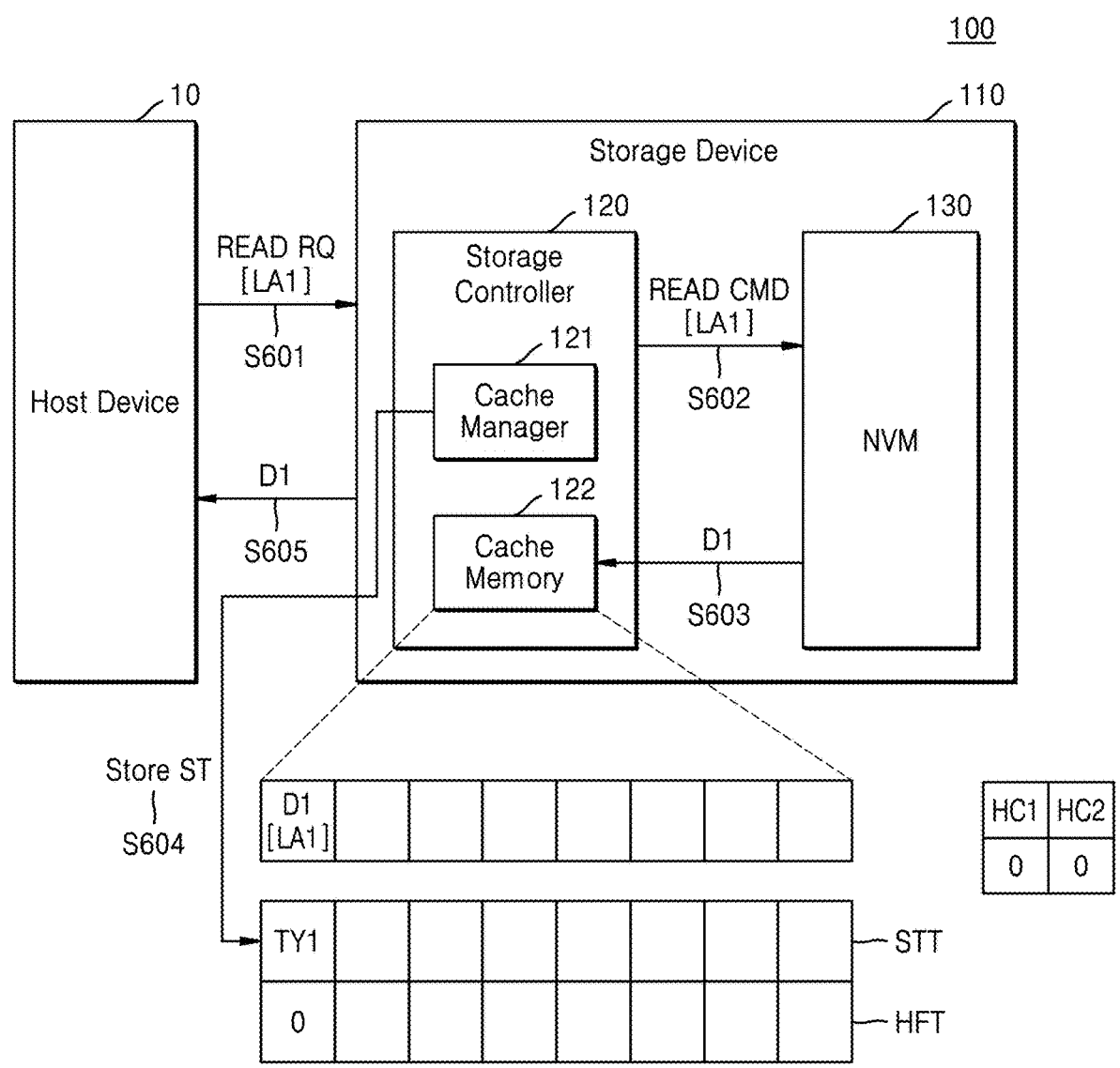
FIGS. 8A to 8D are diagrams showing an operation of a storage system according to an example embodiment.
Figure 8B:
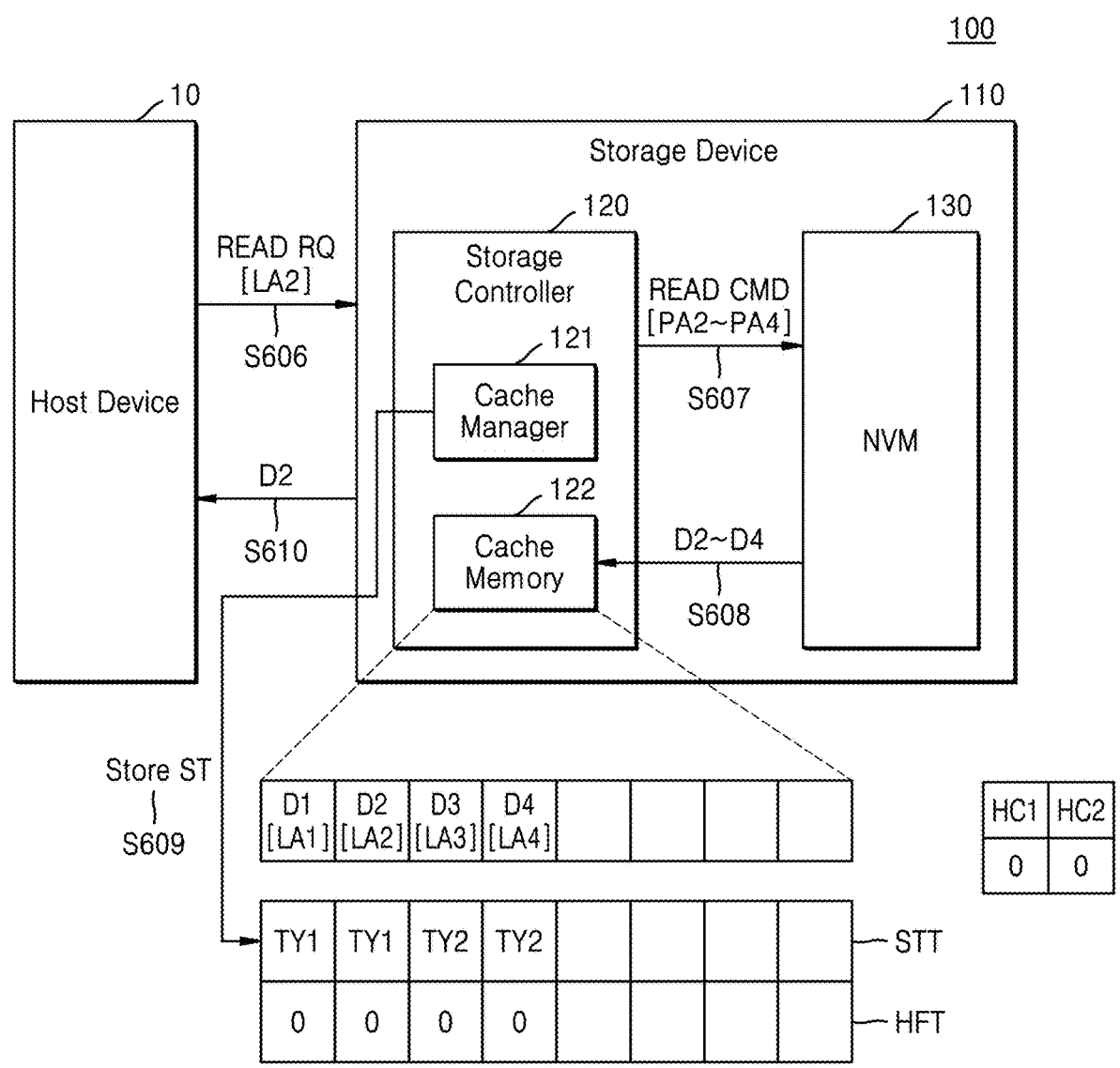
Figure 8C:
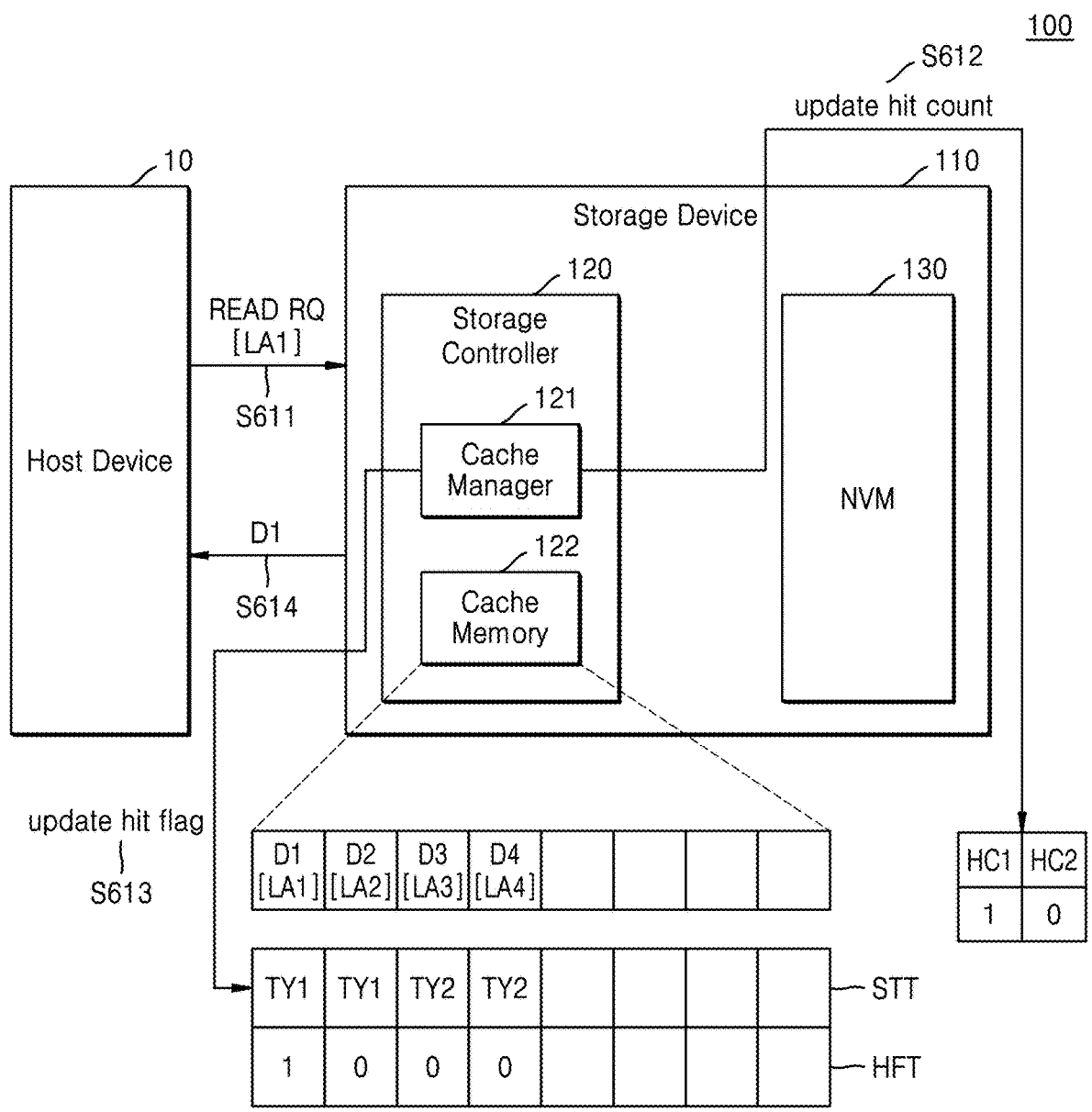
Figure 8D:
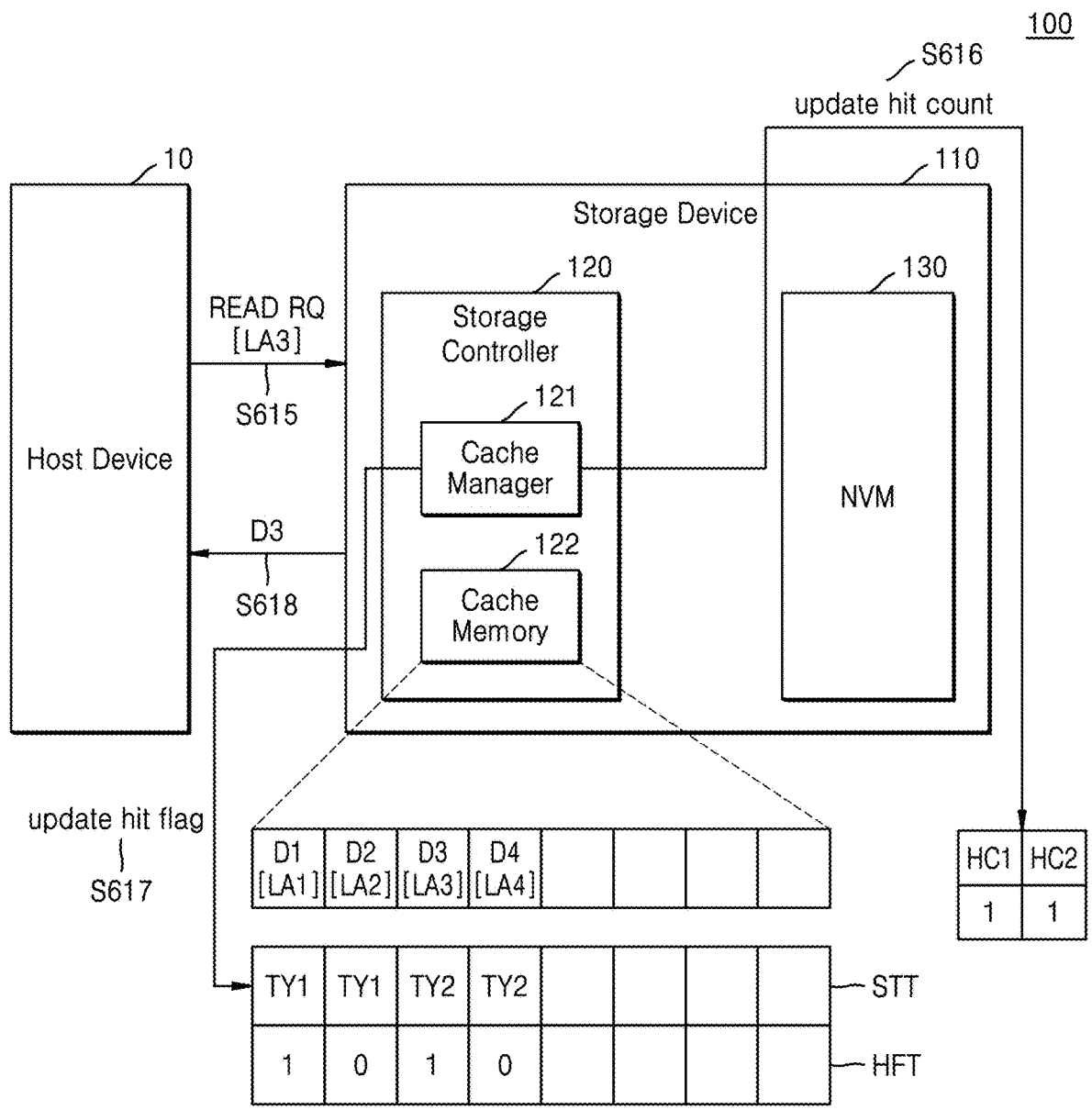

FIG. 7 is a flowchart showing operation S220 of FIG. 4 in more detail according to an example embodiment.

Referring to FIGS. 1, 4, and 7, operation S220 of FIG. 4 may include operations S510 to S540. In operation S510, the storage controller 120 may receive a read request from the host device 10. In operation S520, the storage controller 120 may determine whether a cache hit occurs. In an example embodiment, the storage controller 120 may determine whether data corresponding to a read request is stored in the cache memory 122. In the case of the cache hit, the storage controller 120 may perform operation S530, and in the case of the cache miss, the storage controller 120 may not perform the following operations. In case of the cache miss, the storage controller 120 may load data from the NVM device 130 to the cache memory 122 and set the source type ST as the first type TY1. That is, in case of the cache miss, the storage controller 120 may perform operations S320 and S330 of FIG. 5.

In operation S530, the storage controller 120 may determine the source type ST of data. In the case of the cache hit, the storage controller 120 may determine the source type ST of data corresponding to a cache hit. For example, the storage controller 120 may determine the source type ST of the data by referring to the source type table STT. In some example embodiments, the storage controller 120 may determine the source type ST of the data by referring to the source type ST of a cache entry corresponding to the data.

In operation S540, the storage controller 120 may update a hit count corresponding to the determined source type ST. In an example embodiment, the storage controller 120 may increase the hit count corresponding to the determined source type ST by '1'. For example, when the source type ST of data is the first type TY1, the storage controller 120 may increase the first hit count HC1. When the source type ST of data is the second type TY2, the storage controller 120 may increase the second hit count HC2.

In an example embodiment, the storage controller 120 may transmit data stored in the cache memory 122 to the host device 10. The storage controller 120 may provide the data corresponding to the received read request to the host device 10. The cache hit has occurred, and thus, the storage controller 120 may provide a relatively short read latency.

FIGS. 8A to 8D are diagrams showing an operation of the storage system 100 according to an example embodiment.

Referring to FIGS. 1 and 8A to 8D, for convenience of explanation, it is assumed that the first hit count HC1 is '0' and the second hit count HC2 is '0'. However, the scope of the inventive concepts is not limited thereto.

In operation S601, the host device 10 may transmit a read request including a first logical address LA1. The storage controller 120 may receive a read request. The storage controller 120 may determine whether data corresponding to the first logical address LA1 is stored in the cache memory 122. The storage controller 120 may determine that a cache miss occurs because data corresponding to the first logical address LA1 is not stored in the cache memory 122.

In operation S602, the storage controller 120 may transmit a read command including a first physical address PA1 to the NVM device 130. The storage controller 120 may convert the first logical address LA1 into the first physical address PA1. The storage controller 120 may read data corresponding to the first physical address PA1 from the NVM device 130.

In operation S603, the NVM device 130 may output first data D1 corresponding to the first physical address PA1 to the storage controller 120. The storage controller 120 may store the first data D1 in the cache memory 122.

In operation S604, the cache manager 121 may store the source type ST. The cache manager 121 may determine the source type ST of data (or cache data) loaded into the source type table STT. Because the first data D1 is loaded by the read request from the host device 10, the cache manager 121 may determine the source type ST of the first data D1 to be the first type TY1. The cache manager 121 may store the first type TY1 in relation to the first data D1 in a source type table STT. The cache manager 121 may initialize the hit flag HF in the hit flag table HFT in relation to the first data D1. That is, the cache manager 121 may set the hit flag HF of the first data D1 to a first value (e.g., 0').

In operation S605, the storage controller 120 may transmit the data to the host device 10. For example, the storage controller 120 may provide the first data D1 corresponding to the first logical address LA1 to the host device 10. The storage controller 120 may read the first data D1 from the cache memory 122 and store the first data D1 in the host memory 12.

In operation S606, the host device 10 may transmit the read request including a second logical address LA2. The storage controller 120 may determine whether data corresponding to the second logical address LA2 is stored in the cache memory 122. The storage controller 120 may determine that a cache miss occurs because the data corresponding to the second logical address LA2 is not stored in the cache memory 122. The storage controller 120 may determine to perform a pre-fetch operation.

In operation S607, the storage controller 120 may transmit a read command including the second to fourth physical addresses PA2 to PA4 to the NVM device 130. The storage controller 120 may determine to pre-fetch data corresponding to the third logical address LA3 and the fourth logical address LA4. The storage controller 120 may convert the second logical address LA2 into the second physical address PA2, convert the third logical address LA3 into the third physical address PA3, and convert the fourth logical address LA4 into the third physical address PA4. The storage controller 120 may read the data corresponding to the second physical address PA2 from the NVM device 130 at the request of the host device 10 and read the data corresponding to the third and fourth physical addresses PA3 and PA4 according to the pre-fetch operation.

In operation S608, the NVM device 130 may output the second to fourth data D2 to D4 to the storage controller 120. The second data D2 may correspond to the second physical address PA2, the third data D3 may correspond to the third physical address PA3, and the fourth data D4 may correspond to the fourth physical address PA4. The storage controller 120 may store the second to fourth data D2 to D4 in the cache memory 122.

In operation S609, the cache manager 121 may store the source type ST. Because the second data D2 is loaded by the read request from the host device 10, the cache manager 121 may determine the source type ST of the second data D2 to be the first type TY1. The cache manager 121 may store the first type TY1 in relation to the second data D2 in the source type table STT. Because the third data D3 is loaded through the pre-fetch operation, the cache manager 121 may determine the source type ST of the third data D3 to be the second type TY2. The cache manager 121 may store the second type TY2 in relation to the third data D3 in the source type table STT. Because the fourth data D4 is loaded through the pre-fetch operation, the cache manager 121 may determine the source type ST of the fourth data D4 to be the second type TY2. The cache manager 121 may store the second type TY2 in relation to the fourth data D4 in the source type table STT. The cache manager 121 may set the hit flag HF of each of the second to fourth data D2 to D4 to '0'.

In operation S610, the storage controller 120 may transmit the data to the host device 10. For example, the storage controller 120 may provide the second data D2 corresponding to the second logical address LA2 to the host device 10. The storage controller 120 may read the second data D2 from the cache memory 122 and store the second data D2 in the host memory 12.

In operation S611, the host device 10 may transmit a read request including the first logical address LA1. The storage controller 120 may determine whether data corresponding to the first logical address LA1 is stored in the cache memory 122. The storage controller 120 may determine that a cache hit occurs because the data corresponding to the first logical address LA1 is stored in the cache memory 122.

In operation S612, the cache manager 121 may update a hit count. The cache manager 121 may determine the source type ST of data corresponding to the cache hit (e.g., cache hit data). The cache manager 121 may determine the source type ST of the first data D1 by referring to the source type table STT. The cache manager 121 may determine that the source type ST of the first data D1 is the first type TY1. The cache manager 121 may update the hit count corresponding to the determined source type ST. The cache manager 121 may update the first hit count HC1 corresponding to the first type TY1. The cache manager 121 may increase the first hit count HC1 by '1'. The cache manager 121 may store the first hit count HC1 as '1'.

In operation S613, the cache manager 121 may update the hit flag HF. The cache manager 121 may update the hit flag HF of the data corresponding to the cache hit. The cache manager 121 may store the hit flag HF of the first data D1 in the hit flag table HFT. The cache manager 121 may set the hit flag HF of the first data D1 to a second value (e.g., '1') in the hit flag table HFT.

In operation S614, the storage controller 120 may transmit the data to the host device 10. For example, the storage controller 120 may provide the first data D1 corresponding to the first logical address LA1 to the host device 10. The storage controller 120 may read the first data D1 from the cache memory 122 and store the first data D1 in the host memory 12.

In operation S615, the host device 10 may transmit a read request including the third logical address LA3. The storage controller 120 may determine whether data corresponding to the third logical address LA3 (e.g. third data D3) is stored in the cache memory 122. The storage controller 120 may determine that the cache hit occurs because the data corresponding to the third logical address LA3 (e.g., third data D3) is stored in the cache memory 122.

In operation S616, the cache manager 121 may update the hit count. The cache manager 121 may determine that the source type ST of the third data D3 is the second type TY2. The cache manager 121 may update the second hit count HC2 corresponding to the second type TY2. The cache manager 121 may increase the second hit count HC2 by '1'. The cache manager 121 may store the second hit count HC2 as '1'.

In operation S617, the cache manager 121 may update the hit flag HF. The cache manager 121 may store the hit flag HF of the third data D3 in the hit flag table HFT. The cache manager 121 may set the hit flag HF of the third data D3 to a second value (e.g., '1') in the hit flag table HFT.

In operation S618, the storage controller 120 may transmit the data to the host device 10. For example, the storage controller 120 may provide the third data D3 corresponding to the third logical address LA3 to the host device 10. The storage controller 120 may read the third data D3 from the cache memory 122 and store the third data D3 in the host memory 12.

FIG. 9 is a diagram showing a policy table according to an example embodiment.

Referring to FIGS. 1 and 9, in an example embodiment, the storage controller 120 may determine a cache policy based on the source type ST with a dominant hit rate. The storage controller 120 may dynamically change the cache policy by referring to the policy table. The storage controller 120 may include the policy table. The policy table may include cache policies with respect to a plurality of modes. The storage controller 120 may manage the policy table. The storage controller 120 may store and update the cache policy with respect to each of the plurality of modes in the policy table. The policy table may be previously determined. The policy table may be selected to be fixed or variable by a designer, a manufacturer, and/or a user.

For example, the storage controller 120 may store a first cache policy in the policy table in relation to a first mode. In relation to a second mode, the storage controller 120 may store a second cache policy that is different from the first cache policy in the policy table.

The storage controller 120 may operate in any one of the plurality of modes. In an example embodiment, the storage controller 120 may operate in the first mode. Alternatively, the storage controller 120 may operate in the second mode. The storage controller 120 may determine the mode based on the hit rate. The storage controller 120 may operate in the first mode when a hit rate of the first type TY1 is dominant. The storage controller 120 may operate in the second mode when a hit rate of the second type TY2 is dominant.

The storage controller 120 may determine a cache management policy by referring to the policy table. When the storage controller 120 determines to operate in the first mode, the storage controller 120 may perform the first cache policy corresponding to the first mode by referring to the policy table. When the storage controller 120 determines to operate in the second mode, the storage controller 120 may perform the second cache policy corresponding to the second mode by referring to the policy table.

Figure 10:
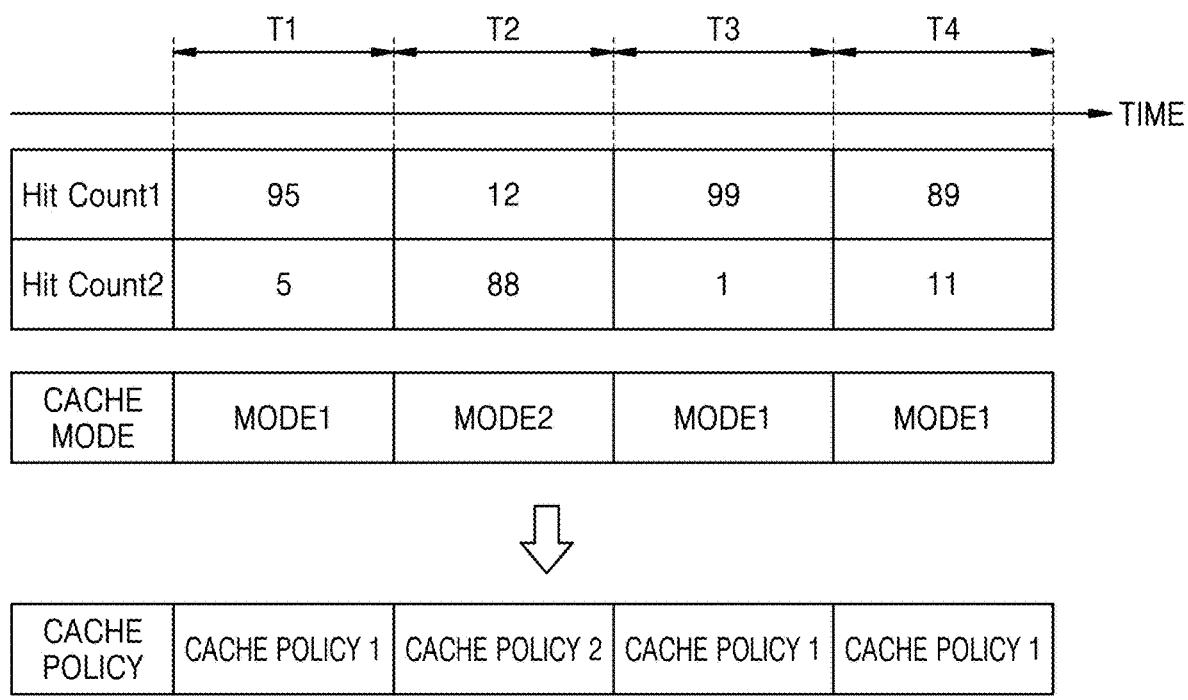
FIG. 10 is a diagram showing an operation of a storage device according to an example embodiment.

FIG. 10 is a diagram showing an operating method of a storage device according to an example embodiment.

Referring to FIGS. 1 and 10, the storage controller 120 may dynamically control a cache policy. The storage controller 120 may change the cache policy in real time. For example, the storage controller 120 may change a victim selection method during operation. In some example embodiments, the storage controller 120 may change a pre-fetch offset or a pre-fetch size during operation.

The storage controller 120 may update the hit count HC corresponding to the source type ST. For example, the source type ST according to a cause of generation may be divided into the first type TY1 generated by an input/output command received from the host device 10 and the second type TY2 generated by a pre-fetch operation. The first hit count HC1 may correspond to the first type TY1, and the second hit count HC2 may correspond to the second type TY2.

In a first period T1, the first hit count HC1 may be '95', and the second hit count HC2 may be '5'. In a second period T2, the first hit count HC1 may be '12', and the second hit count HC2 may be '88'. In a third period T3, the first hit count HC1 may be '99', and the second hit count HC2 may be '1'. In a fourth period T4, the first hit count HC1 may be '89', and the second hit count HC2 may be '1'.

The cache manager 121 may calculate a hit rate. In the first period T1, a hit rate of the first type TY1 may be '95%', and a hit rate of the second type TY2 may be '5%'. Among a plurality of types, the source type ST with a dominant hit rate may be the first type TY1. In the second period T2, the hit rate of the first type TY1 may be '12%', and the hit rate of the second type TY2 may be '88%'. Among the plurality of types, the source type ST with the dominant hit rate may be the second type TY2. In the third period T3, the hit rate of the first type TY1 may be '99%', and the hit rate of the second type TY2 may be '1%'. Among the plurality of types, the source type ST with the dominant hit rate may be the first type TY1. In the fourth period T4, the hit rate of the first type TY1 may be '89%', and the hit rate of the second type TY2 may be '11%'. Among the plurality of types, the source type ST with the dominant hit rate may be the first type TY1.

The storage controller 120 may operate in a mode corresponding to the dominant source type ST. Because the first type TY1 is dominant in the first period T1, the storage controller 120 may operate in a first mode. Because the second type TY2 is dominant in the second period T2, the storage controller 120 may operate in a second mode. Because the first type TY1 is dominant in the third period T3, the storage controller 120 may operate in the first mode. Because the first type TY1 is dominant in the fourth period T4, the storage controller 120 may operate in the first mode.

The storage controller 120 may perform a predetermined (or predefined) cache policy depending on the mode. In the first period T1, the storage controller 120 may perform a first cache policy because operating in the first mode. In the second period T2, the storage controller 120 may perform a second cache policy because operating in the second mode. In the third period T3, the storage controller 120 may perform the first cache policy because operating in the first mode. In the fourth period T4, the storage controller 120 may perform the first cache policy because operating in the first mode.

A workload of the host device 10 may have various read patterns (or input/output pattern). For example, the workload may include both sequential and random patterns. The storage controller 120 may check a hit rate for each source type ST and predict the input/output pattern of the workload based on the hit rate. The storage controller 120 may select a cache policy suitable for the input/output pattern. The storage controller 120 may dynamically set the cache policy suitable for a situation, so that the performance of either workload may not deteriorate.

Figure 11:
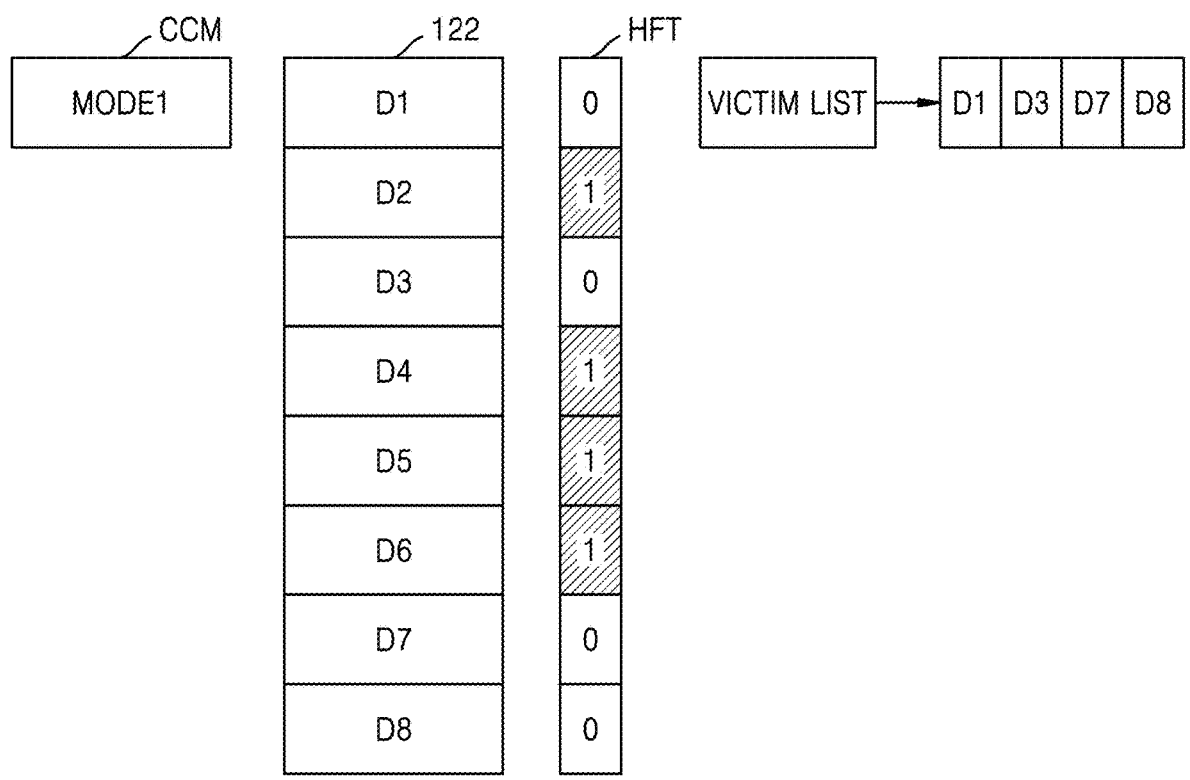
FIG. 11 is a diagram showing an operation of a storage controller according to an example embodiment.
Figure 12:
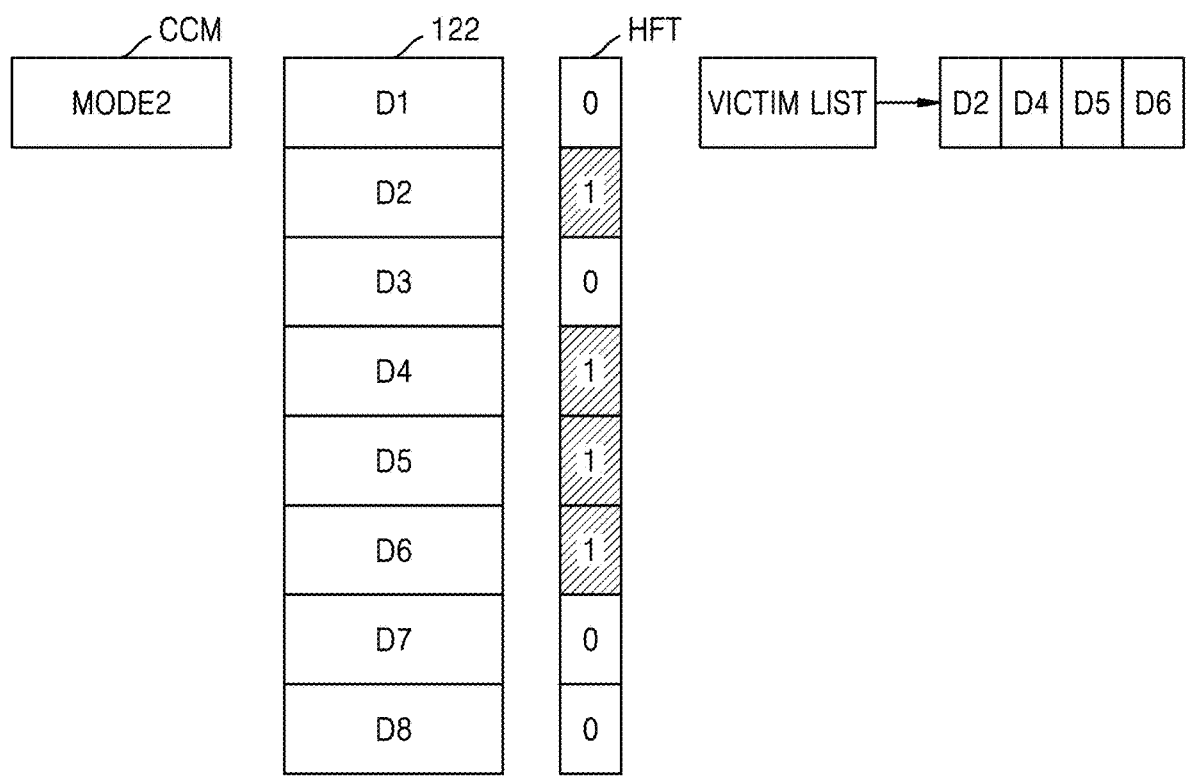
FIG. 12 is a diagram showing an operating method of a storage controller according to an example embodiment.

FIGS. 11 and 12 are diagrams showing an operation of the storage controller 120 according to an embodiment.

The examples of a victim selection method among cache policies are described with reference to FIGS. 11 and 12. In a first mode, the storage controller 120 may perform a first cache policy. In the first mode, the storage controller 120 may perform a first victim selection method among first cache policies. In a second mode, the storage controller 120 may perform a second cache policy. In the second mode, the storage controller 120 may perform a second victim selection method among second cache policies. For example, the storage controller 120 may perform a victim selection method based on the hit flag HF.

Referring to FIGS. 1, 10, 11, and 12, the storage controller 120 may operate in the first mode in the first period T1. That is, in the first period T1, a current cache mode CCM may indicate the first mode.

For example, it is assumed that first to eighth data D1 to D8 are stored in the cache memory 122 in the first period T1. In the first period T1, it is assumed that a cache hit has occurred in the second data D2, the fourth data D4, the fifth data D5, and the sixth data D6. Accordingly, the hit flag HF of the first data D1 may indicate a first value (e.g., '0'), the hit flag HF of the second data D2 may indicate a second value (e.g., '1'), the hit flag HF of the third data D3 may indicate the first value (e.g., '0'), the hit flag HF of the fourth data D4 may indicate the second value (e.g., '1'), the hit flag HF of the fifth data D5 may indicate the second value (e.g., '1'), the hit flag HF of the sixth data D6 may indicate the second value (e.g., '1'), the hit flag HF of the seventh data D7 may indicate the first value (e.g., '0'), and the hit flag HF of the eighth data D8 may indicate the first value (e.g., '0').

In the first period T1, because the current cache mode CCM is the first mode, the storage controller 120 may perform the first cache policy. The storage controller 120 may perform the first victim selection method among the first cache policies. The first victim selection method may be a method of selecting a victim entry (or victim cache) from among entries in which no hit occurred. For example, data having the hit flag HF indicating the first value (e.g., '0') may include the first data D1, the third data D3, the seventh data D7, and the eighth data D8 among the plurality of data D1 to D8. Accordingly, a victim list may indicate the first data D1, the third data D3, the seventh data D7, and the eighth data D8.

For example, in the first period T1, the first type TY1 may have a dominant hit rate. That is, more cache hits may occur with respect to data loaded into the cache memory 122 due to a read request from the host device 10. In other words, compared to cache data loaded by a pre-fetch operation, more cache hits may occur with respect to cache data loaded by a request from the host device 10. In this case, the storage controller 120 may predict that the host device 10 is to request an additional read of hot data. Accordingly, performance may be improved by selecting a victim entry from among entries in which a cache hit has not occurred.

In the second period T2, the storage controller 120 may operate in the second mode. That is, in the second period T2, the current cache mode CCM may indicate the second mode. In the second period T2, because the current cache mode CCM is the second mode, the storage controller 120 may perform the second cache policy. The storage controller 120 may perform a second victim selection method among the second cache policies. The second victim selection method may be a method of selecting a victim entry from among entries in which a hit occurred. For example, data having the hit flag HF indicating the second value (e.g., '1') may include the second data D2, the fourth data D4, the fifth data D5, and the sixth data D6 among the plurality of data D1 to D8. Accordingly, the victim list may indicate the second data D2, the fourth data D4, the fifth data D5, and the sixth data D6.

For example, in the second period T2, the second type TY2 may have the dominant hit rate. That is, more cache hits may occur with respect to data loaded into the cache memory 122 due to a pre-fetch operation of the host device 10. In other words, compared to cache data loaded by a request from the host device 10, more cache hits may occur with respect to cache data loaded by the pre-fetch operation. In this case, the storage controller 120 may predict that the host device 10 is to request an additional read of data in which no hit has occurred. Accordingly, performance may be improved by selecting a victim entry from among entries in which the cache hit has occurred.

Figure 13:
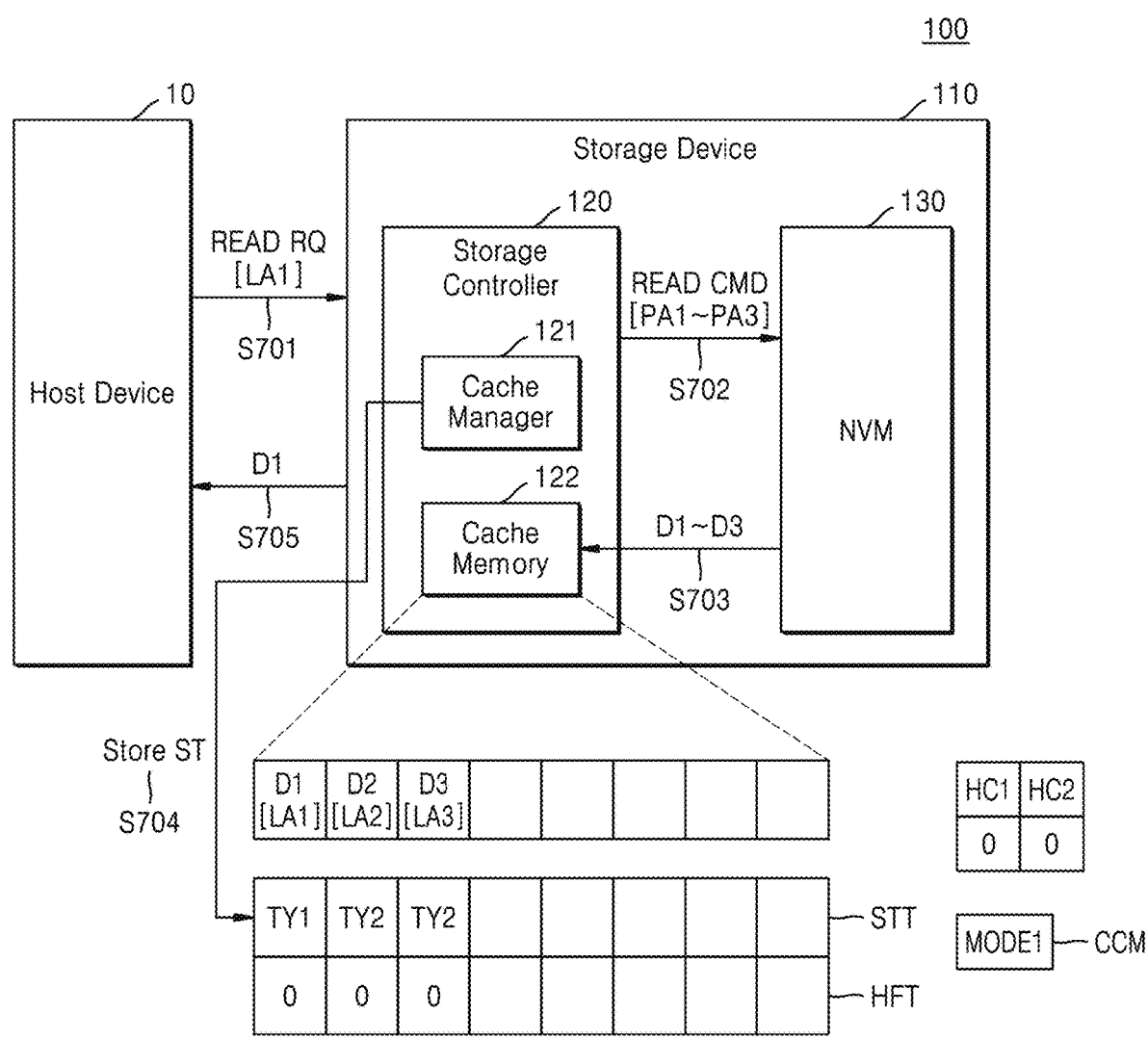
FIG. 13 is a diagram showing an operation of a storage controller according to an example embodiment.
Figure 14:
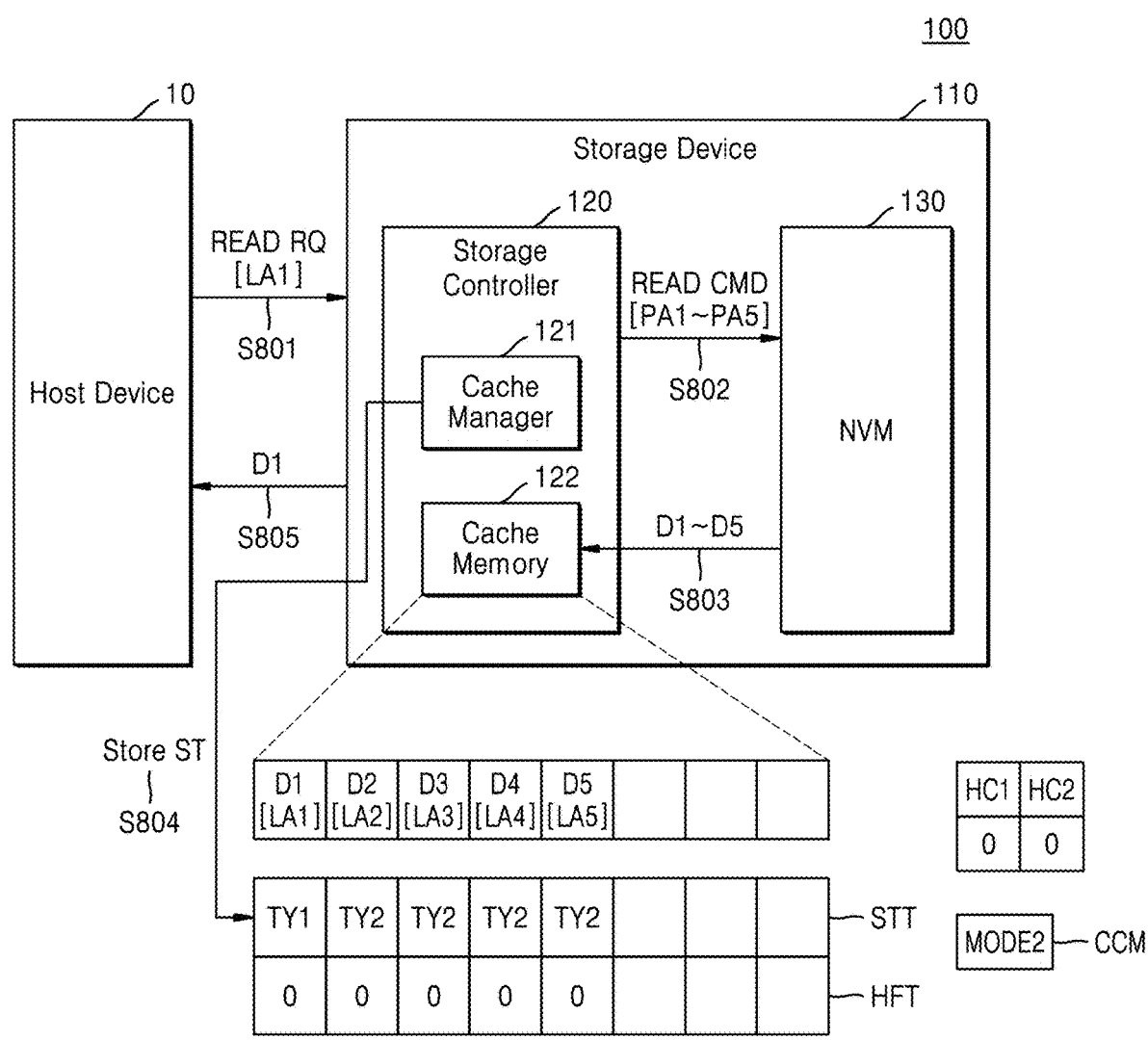
FIG. 14 is a diagram showing an operation of a storage controller according to an example embodiment.

FIGS. 13 and 14 are diagrams showing an operation of the storage controller 120 according to an example embodiment.

The examples of pre-fetch size among cache policies are described with reference to FIGS. 10, 13, and 14. FIG. 13 is a diagram corresponding to the first period T1 of FIG. 10, and FIG. 14 is a diagram corresponding to the second period T2 of FIG. 10. The operating method of the storage controller 120 in a first mode is described with reference to FIG. 13, and the operating method of the storage controller 120 in a second mode is described with reference to FIG. 14.

In an example embodiment, in the first mode, the storage controller 120 may perform a first cache policy. In the first mode, the storage controller 120 may perform a pre-fetch operation based on a first pre-fetch size among first cache policies. In the second mode, the storage controller 120 may perform a second cache policy. In the second mode, the storage controller 120 may perform the pre-fetch operation based on a second pre-fetch size among second cache policies.

Referring to FIGS. 1, 10, 13, and 14, the storage controller 120 may operate in the first mode in the first period T1. That is, in the first period T1, the current cache mode CCM may indicate the first mode. The storage controller 120 may perform the first cache policy. The first cache policy may include the first pre-fetch size. That is, the storage controller 120 may perform the pre-fetch operation based on the first pre-fetch size. For example, the first pre-fetch size may indicate a third value (e.g., '2').

In operation S701, the host device 10 may transmit a read request including the first logical address LA1. The storage controller 120 may determine whether data corresponding to the first logical address LA1 is stored in the cache memory 122. The storage controller 120 may determine that a cache miss occurs because the data corresponding to the first logical address LA1 is not stored in the cache memory 122. The storage controller 120 may determine to perform the pre-fetch operation.

In operation S702, the storage controller 120 may transmit a read command including the first to third physical addresses PA1 to PA3 to the NVM device 130. The storage controller 120 may perform the pre-fetch operation based on the first pre-fetch size. Because the first pre-fetch size is a third value (e.g., '2'), the storage controller 120 may determine to pre-fetch data corresponding to the second logical address LA2 and the third logical address LA3. The storage controller 120 may read data corresponding to the first physical address PA1 from the NVM device 130 at the request of the host device 10, and may read data corresponding to the second and third physical addresses PA2 and PA3 according to the pre-fetch operation.

In operation S703, the NVM device 130 may output the first to third data D1 to D3 to the storage controller 120. The storage controller 120 may store the first to third data D1 to D3 in the cache memory 122.

In operation S704, the cache manager 121 may store the source type ST. Because the first data D1 is loaded by a read request from the host device 10, the cache manager 121 may determine the source type ST of the first data D1 to be the first type TY1. The cache manager 121 may set the source type ST of the first data D1 to the first type TY1 in the source type table STT. Because the second data D2 is loaded through the pre-fetch operation, the cache manager 121 may determine the source type ST of the second data D2 to be the second type TY2. The cache manager 121 may set the source type ST of the second data D2 to the second type TY2 in the source type table STT. Because the third data D3 is loaded through the pre-fetch operation, the cache manager 121 may determine the source type ST of the third data D3 to be the second type TY2. The cache manager 121 may set the source type ST of the third data D3 to the second type TY2 in the source type table STT. The cache manager 121 may set the hit flag HF of the first to third data D1 to D3 to '0' in the hit flag table HFT.

In operation S705, the storage controller 120 may transmit data to the host device 10. For example, the storage controller 120 may provide the first data D1 corresponding to the first logical address LA1 to the host device 10.

For example, in the first period T1, the first type TY1 may have a dominant hit rate. That is, more cache hits may occur with respect to data loaded into the cache memory 122 due to a read request from the host device 10. In this case, the storage controller 120 may predict that the host device 10 is to request an additional read of hot data. Accordingly, the storage controller 120 may perform less pre-fetch operation. The storage controller 120 may perform the pre-fetch operation by using a small pre-fetch size. That is, the storage controller 120 may perform the pre-fetch operation by using the first pre-fetch size. Accordingly, an amount of data loaded into the cache memory 122 by the pre-fetch operation may be reduced. Performance may be improved by increasing the amount of data corresponding to the first type TY1 in the cache memory 122, compared to data corresponding to the second type TY2.

In the second period T2, the storage controller 120 may operate in the second mode. That is, in the second period T2, the current cache mode CCM may indicate the second mode. The storage controller 120 may perform the second cache policy. The second cache policy may include the second pre-fetch size. That is, the storage controller 120 may perform the pre-fetch operation based on the second pre-fetch size. For example, the second pre-fetch size may indicate a fourth value (e.g., 4')

In operation S801, the host device 10 may transmit a read request including the first logical address LA1. The storage controller 120 may determine whether data corresponding to the first logical address LA1 is stored in the cache memory 122. The storage controller 120 may determine that a cache miss occurs because the data corresponding to the first logical address LA1 is not stored in the cache memory 122. The storage controller 120 may determine to perform the pre-fetch operation.

In operation S802, the storage controller 120 may transmit a read command including the first to fifth physical addresses PA1 to PA5 to the NVM device 130. The storage controller 120 may perform the pre-fetch operation based on the second pre-fetch size. Because the second pre-fetch size is a fourth value (e.g., 4'), the storage controller 120 may determine to pre-fetch data corresponding to the second logical addresses LA2 to the fifth logical addresses LA5.

The storage controller 120 may read data corresponding to the first physical address PA1 from the NVM device 130 at the request of the host device 10, and may read data corresponding to the second to fifth physical addresses PA2 to PA5 according to the pre-fetch operation.

In operation S803, the NVM device 130 may output the first to fifth data D1 to D5 to the storage controller 120. The storage controller 120 may store the first to fifth data D1 to D5 in the cache memory 122.

In operation S704, the cache manager 121 may store the source type ST. Because the first data D1 is loaded by a read request from the host device 10, the cache manager 121 may determine the source type ST of the first data D1 to be the first type TY1. The cache manager 121 may set the source type ST of the first data D1 to the first type TY1 in the source type table STT. Because the second data D2 is loaded through the pre-fetch operation, the cache manager 121 may determine the source type ST of the second data D2 to be the second type TY2. The cache manager 121 may set the source type ST of the second data D2 to the second type TY2 in the source type table STT. Because the third data D3 is loaded through the pre-fetch operation, the cache manager 121 may determine the source type ST of the third data D3 to be the second type TY2. The cache manager 121 may set the source type ST of the third data D3 to the second type TY2 in the source type table STT. Because the fourth data D34 is loaded through the pre-fetch operation, the cache manager 121 may determine the source type ST of the fourth data D4 to be the second type TY2. The cache manager 121 may set the source type ST of the fourth data D4 to the second type TY2 in the source type table STT. Because the fifth data D5 is loaded through the pre-fetch operation, the cache manager 121 may determine the source type ST of the fifth data D5 to be the second type TY2. The cache manager 121 may set the source type ST of the fifth data D5 to the second type TY2 in the source type table STT. The cache manager 121 may set the hit flag HF of the first to fifth data D1 to D5 to '0' in the hit flag table HFT.

In operation S805, the storage controller 120 may transmit the data to the host device 10. For example, the storage controller 120 may provide the first data D1 corresponding to the first logical address LA1 to the host device 10.

For example, in the second period T2, the second type TY2 may have a dominant hit rate. That is, more cache hits may occur with respect to data loaded into the cache memory 122 by the pre-fetch operation. In this case, the storage controller 120 may predict that the host device 10 is to request an additional read of the pre-fetched data. Accordingly, the storage controller 120 may further perform the pre-fetch operation. The storage controller 120 may perform the pre-fetch operation by using the pre-fetch size having a large value. That is, the storage controller 120 may perform the pre-fetch operation by using a second pre-fetch size. Accordingly, an amount of data loaded into the cache memory 122 by the pre-fetch operation may be increased. Performance may be improved by increasing the amount of data corresponding to the second type TY2 in the cache memory 122, compared to data corresponding to the first type TY1.

Figure 15:
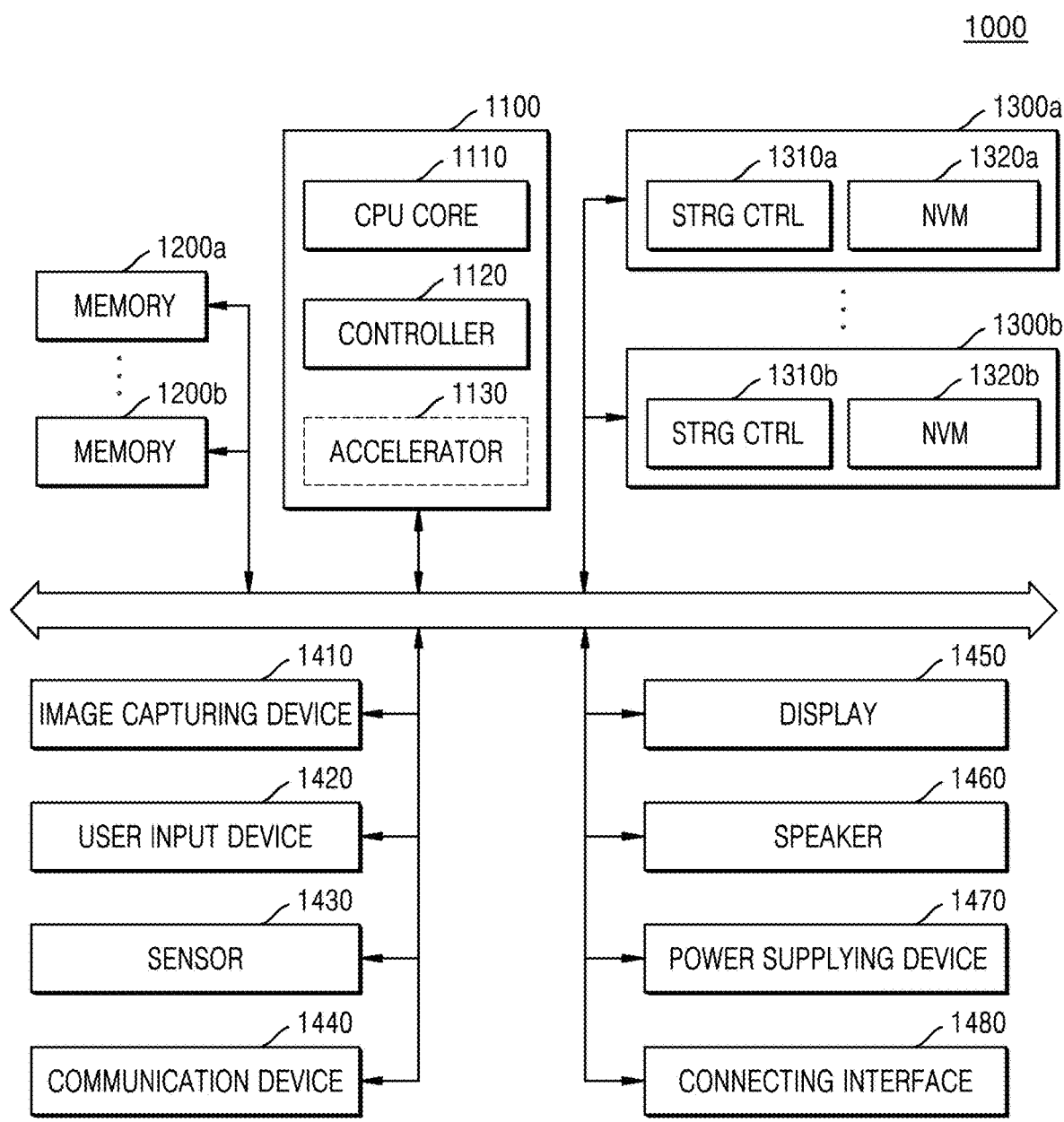
FIG. 15 is a diagram showing a system to which a memory device according to an example embodiment is applied.

FIG. 15 is a diagram showing a system 1000 to which a memory device according to an example embodiment is applied.

The system 1000 of FIG. 15 may be a (mobile) system such as a mobile phone, a smart phone, a tablet PC, a wearable device, a healthcare device, or an Internet of things (IOT) device. However, the system 1000 of FIG. 15 is not necessarily limited to the mobile system, but may be a PC, a laptop computer, a server, an automotive device such as a media player, or navigation, etc.

Referring to FIG. 15, the system 1000 may include a main processor 1100, memories 1200a and 1200b, and storage devices 1300a and 1300b, and may additionally include one or more of an image capturing device 1410, a user input device 1420, a sensor 1430, a communication device 1440, a display 1450, a speaker 1460, a power supplying device 1470, and connecting interface 1480.

The main processor 1100 may control the overall operation of the system 1000, and more specifically, operations of other components included in the system 1000. The main processor 1100 may be implemented as a general-purpose processor, a dedicated processor, or an AP.

The main processor 1100 may include one or more CPU cores 1110 and may further include a controller 1120 controlling the memories 1200a and 1200b and/or the storage devices 1300a and 1300b. According to an embodiment, the main processor 1100 may further include an accelerator 1130, which is a dedicated circuit for high-speed data calculation such as artificial intelligence (AI) data calculation. Such an accelerator 1130 may include a graphics processing unit (GPU), a neural processing unit (NPU), and/or a data processing unit (DPU), and may also be implemented as a separate chip physically independent from other components of the main processor 1100.

The memories 1200a and 1200b may be used as main memory devices of the system 1000 and may include volatile memory such as SRAM and/or DRAM, but may also include NVM such as flash memory, PRAM and/or RRAM. The memories 1200a and 1200b may also be implemented in the same package as the main processor 1100.

The storage devices 1300a and 1300b may function as non-volatile storage devices that store data regardless of whether power is supplied, and may have a relatively large storage capacity compared to the memories 1200a and 1200b. The storage devices 1300a and 1300b may include storage controllers 1310a and 1310b, and NVM 1320a and 1320b that respectively store data by the control of the storage controllers 1310a and 1310b. The NVMs 1320a and 1320b may include flash memory of a 2-dimensional (2D) structure or a 3-dimensional (3D) vertical NAND (V-NAND) structure, but may also include another type of memory such as PRAM and/or RRAM.

The storage devices 1300a and 1300b may be included in the system 1000 while being physically separate from the main processor 1100, or may be implemented in the same package as the main processor 1100. In addition, the storage devices 1300a and 1300b have a form such as a solid state device (SSD) or a memory card, and may be detachably coupled to other components of the system 1000 through an interface such as the connecting interface 1480 to be described below. Such storage devices 1300a and 1300b may be devices to which a standard protocol such as Universal Flash Storage (UFS), embedded multi-media card (eMMC), or NVM express (NVMe) is applied, but are not necessarily limited thereto.

The image capturing device 1410 may capture a still image or a moving image, and may be a camera, a camcorder, and/or a webcam.

The user input device 1420 may receive various types of data input from a user of the system 1000, and may be used through a touch pad, a keypad, a keyboard, a mouse and/or a microphone, etc.

The sensor 1430 may sense various types of physical quantities that may be obtained from outside the system 1000 and convert the sensed physical quantities into electrical signals. Such a sensor 1430 may be a temperature sensor, a pressure sensor, an illumination sensor, a position sensor, an acceleration sensor, a biosensor, and/or a gyroscope sensor.

The communication device 1440 may transmit and receive signals with other devices outside the system 1000 according to various communication protocols. Such a communication device 1440 may be implemented including an antenna, a transceiver, and/or a modem.

The display 1450 and the speaker 1460 may function as output devices that output visual information and auditory information, respectively, to the user of the system 1000.

The power supplying device 1470 may appropriately convert power supplied from a battery (not shown) built into the system 1000 and/or an external power source and supply the power to each of the components of the system 1000.

The connecting interface 1480 may provide a connection between the system 1000 and an external device that is connected to the system 1000 and may exchange data with the system 1000. The connecting interface 1480 may be implemented through various interface methods such as an ATA, Serial ATA (SATA), external SATA (e-SATA), SCSI, Serial Attached SCSI (SAS), PCI, PCI express (PCIe), NVMe, IEEE 1394, universal serial bus (USB), secure digital (SD) card, multi-media card (MMC), eMMC, UFS, embedded Universal Flash Storage (eUFS), compact flash (CF) card interface, etc.

In an example embodiment, the storage devices 1300a and 1300b may include the cache manager 121 and cache memory 122 described with reference to FIGS. 1 to 14. The storage devices 1300a and 1300b may each perform a monitoring operation and a cache adjustment operation, as described with reference to FIGS. 1 to 14. That is, the storage devices 1300a and 1300b may determine an input/output pattern of the current workload and change cache policies in real time. Accordingly, the storage devices 1300a and 1300b may apply a cache policy suitable for the current input/output pattern, thereby preventing deterioration of performance.

Figure 16:
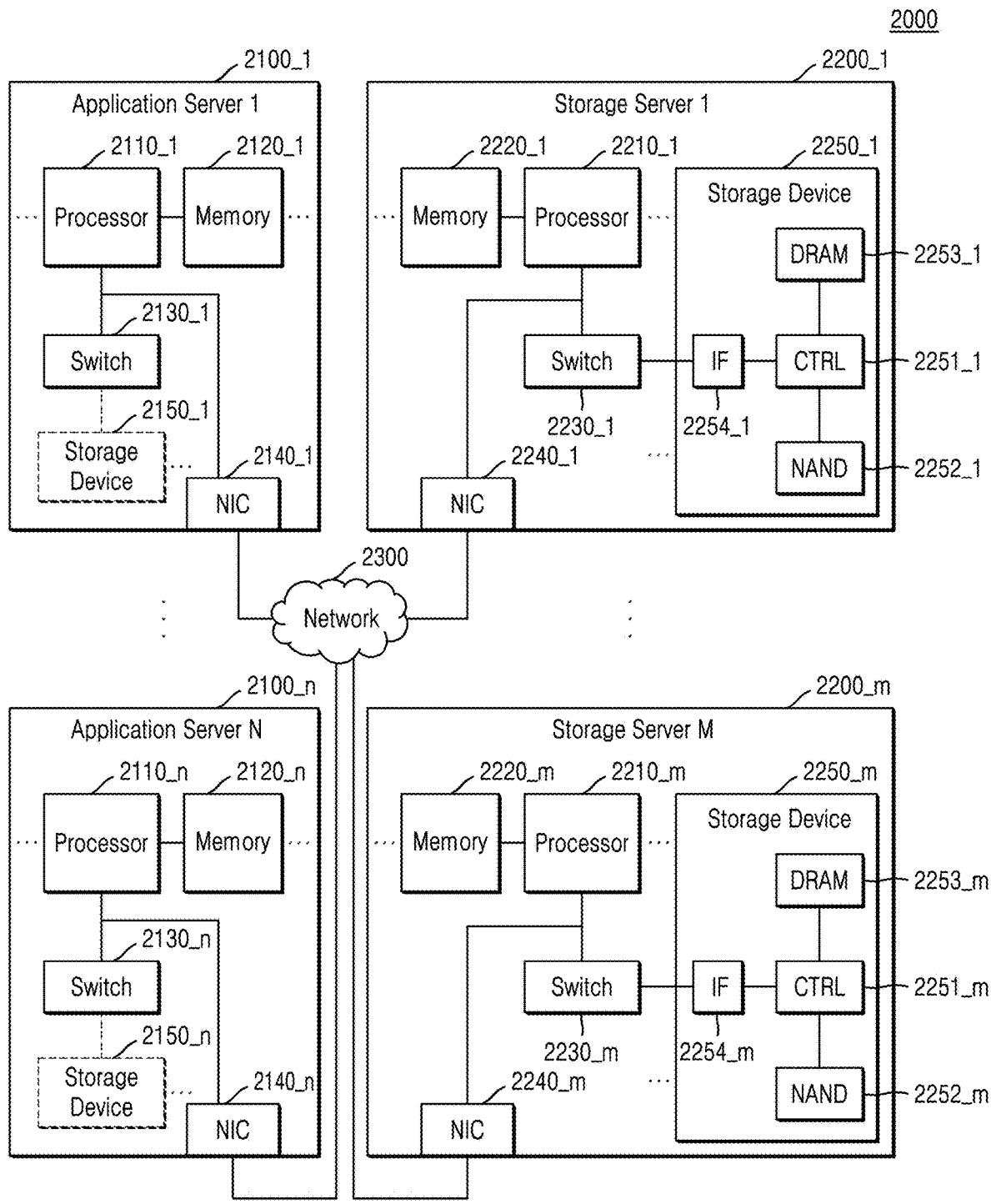
FIG. 16 is a block diagram showing an example of a data center to which a storage device according to an example embodiment is applied.

FIG. 16 is a block diagram showing an example of a data center 2000 to which a storage device according to an example embodiment is applied.

The data center 2000 is a facility that maintains a variety of data and provides various services for a variety of data, and may be referred to as a data storage center. The data center 2000 may be a system for operating a search engine or database, and may be a computing system used in various organizations. The data center 2000 may include a plurality of application servers 2100_1 to 2100_n and a plurality of storage servers 2200_1 to 2200_m. The number of application servers 2100_1 to 2100_n and the number of storage servers 2200_1 to 2200_m may be modified in various ways.

Hereinafter, for convenience of explanation, an example of the first storage server 2200_1 is described. Each of the remaining storage servers 2200_2 to 2200_m and the plurality of application servers 2100_1 to 2100_n may have a structure similar to that of the first storage server 2200_1.

The first storage server 2200_1 may include a processor 2210_1, a memory 2220_1, a switch 2230_1, a network interface connector (NIC) 2240_1, and a storage device 2250_1. The processor 2210_1 may control the overall operation of the first storage server 2200_1. The memory 2220_1 may store various instructions or data by the control of the processor 2210_1. The processor 2210_1 may be configured to access the memory 2220_1 to execute various instructions or process data. In an example embodiment, the memory 2220_1 may include at least one of various types of memory devices such as Double Data Rate Synchronous DRAM (DDR SDRAM), High Bandwidth Memory (HBM), Hybrid Memory Cube (HMC), Dual In-line Memory Module (DIMM), Optane DIMM, or Non-Volatile DIMM (NVDIMM).

In an example embodiment, the number of processors 2210_1 and the number of memories 2220_1 included in the first storage server 2200_1 may be modified in various ways. In an example embodiment, the processor 2210_1 and the memory 2220_1 included in the first storage server 2200_1 may configure a processor-memory pair, and the number of processor-memory pairs included in the first storage server 2200_1 may be modified in various ways. In an example embodiment, the number of processors 2210_1 and the number of memories 2220_1 included in the first storage server 2200_1 may be different. The processor 2210_1 may include a single core processor or a multi-core processor.

The switch 2230_1 may selectively connect the processor 2210_1 to the storage device 2250_1 or may selectively connect the NIC 2240_1 to the storage device 2250_1 by the control of the processor 2210_1.

The NIC 2240_1 may be configured to connect the first storage server 2200_1 to a network 2300. The NIC 2240_1 may include a network interface card, a network adapter, etc. The NIC 2240_1 may be connected to the network 2300 by a wired interface, a wireless interface, a Bluetooth interface, an optical interface, etc. The NIC 2240_1 may include internal memory, a DSP, a host bus interface, etc., and may be connected to the processor 2210_1 or the switch 2230_1 through the host bus interface. The host bus interface may include at least one of various interfaces such as ATA, SATA, e-SATA, SCSI, SAS, PCI, PCIe, NVMe, IEEE 1394, USB, SD card, MMC, eMMC, UFS, eUFS, CF card interface, etc. In an example embodiment, the NIC 2240_1 may be integrated with at least one of the processor 2210_1, the switch 2230_1, or the storage device 2250_1.

The storage device 2250_1 may store data or output the stored data by the control of the processor 2210_1. The storage device 2250_1 may include a controller 2251_1, an NVM 2252_1, a DRAM 2253_1, and an interface 2254_1. In an example embodiment, the storage device 2250_1 may further include a Secure Element (SE) for security or privacy.

The controller 2251_1 may control the overall operation of the storage device 2250_1. In an embodiment, the controller 2251_1 may include SRAM. The controller 2251_1 may store data in the NVM 2252_1 or output data stored in the NVM 2252_1 in response to signals received through the interface 2254_1. In an example embodiment, the controller 2251_1 may be configured to control the NVM 2252_1 based on a toggle interface or an ONFI.

The DRAM 2253_1 may be configured to temporarily store data to be stored in the NVM 2252_1 or data read from the NVM 2252_1. The DRAM 2253_1 may be configured to store a variety of data (e.g., meta data, mapping data, etc.) required for the controller 2251_1 to operate. The interface 2254_1 may provide a physical connection between the processor 2210_1, the switch 2230_1, or the NIC 2240_1 and the controller 2251_1. In an embodiment, the interface 2254_1 may be implemented in a Direct Attached Storage (DAS) method of directly connecting the storage device 2250_1 with a dedicated cable. In an example embodiment, the interface 2254_1 may be configured based on at least one of various interfaces described above through the host interface bus.

The configurations of the first storage server 2200_1 described above are examples, and the scope of the inventive concepts is not limited thereto. The configurations of the first storage server 2200_1 described above may be applied to each of the other storage servers 2200_2 to 2200_m or the plurality of application servers 2100_1 to 2100_n. In an example embodiment, in each of the plurality of application servers 2100_1 to 2100_n, the storage device 2150_1 may be selectively omitted.

The plurality of application servers 2100_1 to 2100_n and the plurality of storage servers 2200_1 to 2200_m may communicate with each other over the network 2300. The network 2300 may be implemented using a fiber channel (FC) or Ethernet. At this time, the FC is a medium used for relatively high-speed data transmission, and may use an optical switch that provides high performance/high availability. According to an access method of the network 2300, the storage servers 2200_1 to 2200_m may be each provided as file storage, block storage, or object storage.

In an example embodiment, the network 2300 may be a storage-only network, such as a storage area network (SAN). For example, the SAN may be a fiber channel storage area network (FC-SAN) that uses an FC network and is implemented according to the fiber channel protocol (FCP). In some example embodiments, the SAN may be an IP-SAN that uses a TCP/IP network and is implemented according to the SCSI over TCP/IP or Internet SCSI (iSCSI) protocol. In an example embodiment, the network 2300 may be a general network, such as a TCP/IP network. For example, the network 2300 may be implemented according to a protocol such as FC over Ethernet (FCOE), Network Attached Storage (NAS), NVMe over Fabrics (NVMe-oF), etc.

In an example embodiment, at least one of the plurality of application servers 2100_1 to 2100_n may be configured to access at least another one of the plurality of application servers 2100_1 to 2100_n or at least one of the plurality of storage servers 2200_1 to 2200_m over the network 2300.

For example, the first application server 2100_1 may store data requested by a user or a client in at least one of the plurality of storage servers 2200_1 to 2200_m over the network 2300. In some example embodiments, the first application server 2100_1 may obtain data requested by the user or the client from at least one of the plurality of storage servers 2200_1 to 2200_m over the network 2300. In this case, the first application server 2100_1 may be implemented as a web server or a database management system (DBMS).

That is, the processor 2110_1 of the first application server 2100_1 may access the memory 2120_n or the storage device 2150_n of another application server (e.g., 2100_n) over the network 2300. In some example embodiments, the processor 2110_1 of the first application server 2100_1 may access the memory 2220_1 or the storage device 2250_1 of the first storage server 2200_1 over the network 2300. Through this, the first application server 2100_1 may perform various operations on data stored in the other application servers 2100_2 to 2100_n or the plurality of storage servers 2200_1 to 2200_m. For example, the first application server 2100_1 may execute or issue a command to move or copy data between the other application servers 2100_2 to 2100_n or the plurality of storage servers 2200_1 to 2200_m. In this case, the data to be moved or copied may be moved from the storage devices 2250_1 to 2250_m of the storage servers 2200_1 to 2200_m to the memories 2120_1 to 2120_n of the application servers 2100_1 to 2100_n through the memories 2220_1 to 2220_m of the storage servers 2200_1 to 2200_m or directly. Data transmitted over the network 2300 may be encrypted for security or privacy.

In an example embodiment, the storage devices 2150_1 to 2150_n and 2250_1 to 2250_m described above may each include a cache manager and a cache memory according to an embodiment. The storage devices 2150_1 to 2150_n and 2250_1 to 2250_m may each perform a monitoring operation and a cache adjustment operation described with reference to FIGS. 1 to 14. The storage devices 2150_1 to 2150_n and 2250_1 to 2250_m may each perform a cache policy suitable for a current workload based on information collected through the monitoring operation. Accordingly, the storage device and the storage system with improved performance are provided.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to some example embodiments thereof, it will be understood that various changes in form and details may be made therein without departing from the spirit and scope of the following claims.

What is claimed is:

1. An operating method of a storage controller, the operating method comprising:
    storing data and a source type of the data in a cache memory;
    when a cache hit occurs, determining a source type of data corresponding to the cache hit and updating a hit count corresponding to the determined source type among a plurality of hit counts;
    determining a source type with a dominant hit rate among a plurality of source types based on the plurality of hit counts;
    operating in a first mode when a result of the determining indicates that the source type with the dominant hit rate is a first type; and
    operating in a second mode when the result of the determining indicates that the source type with the dominant hit rate is a second type.

2. The operating method of claim 1, wherein
    the first type indicates a type of data loaded by an input/output request received from an external host device, and
    the second type indicates a type of data loaded by a pre-fetch operation.

3. The operating method of claim 1, wherein the storing includes:
    receiving a read request from an external host device;
    in response to the read request, loading data corresponding to an address included in the read request from a non-volatile memory (NVM) device; and
    storing the source type of the data loaded from the NVM device as the first type.

4. The operating method of claim 1, wherein the storing includes:
    determining whether to perform a pre-fetch operation;
    when a result of the determining whether to perform a pre-fetch operation indicates to perform the pre-fetch operation, loading data from a non-volatile memory (NVM) device into the cache memory; and
    storing the source type of the data loaded from the NVM device as the second type.

5. The operating method of claim 4, wherein the loading the data from the NVM device into the cache memory includes reading, from the NVM device, the data corresponding to an address predicted to be requested later by an external host device.

6. The operating method of claim 1, wherein the determining the source type of data corresponding to the cache hit and the updating the hit count corresponding to the determined source type among the plurality of hit counts includes:
    receiving a read request from an external host device;
    determining whether data corresponding to the read request is stored in the cache memory;
    when the cache hit occurs, determining the source type of the data corresponding to the cache hit; and
    updating the hit count corresponding to the determined source type.

7. The operating method of claim 1, wherein
    the operating in the first mode includes performing a first cache policy corresponding to the first mode, and
    the operating in the second mode includes performing a second cache policy corresponding to the second mode.

8. The operating method of claim 7, wherein
    the performing of the first cache policy includes performing a first victim selection method, and
    the performing of the second cache policy includes performing a second victim selection method that is different from the first victim selection method.

9. The operating method of claim 8, wherein each of the first victim selection method and the second victim selection method includes one of least recently used (LRU), most recently used (MRU), and first-in-first-out (FIFO).

10. The operating method of claim 8, wherein
    the first victim selection method refers to a method of selecting one of entries in which a cache hit occurred as a victim entry, and
    the second victim selection method refers to a method of selecting one of entries in which no cache hit occurred as a victim entry.

11. The operating method of claim 7, wherein
    the performing the first cache policy includes performing a pre-fetch operation based on a first pre-fetch size, and
    the performing the second cache policy includes performing the pre-fetch operation based on a second pre-fetch size that is different from the first pre-fetch size.

12. An operating method of a storage device comprising a storage controller and a non-volatile memory (NVM) device, the operating method comprising:
    outputting, by the NVM device, data to the storage controller;
    storing, by the storage controller, the data output from the NVM and a source type of the data in a cache memory;
    when a cache hit occurs, determining, by the storage controller, a source type of data corresponding to the cache hit and updating a hit count corresponding to the determined source type among a plurality of hit counts;
    operating, by the storage controller, in a mode corresponding to a dominant source type from among a plurality of source types; and
    performing, by the storage controller, a cache policy corresponding to the mode.

13. The operating method of claim 12, wherein the storing includes:

receiving a read request from an external host device;

in response to the read request, loading data corresponding to an address included in the read request from the NVM device; and storing the source type of the data loaded from the NVM device as a first type.

14. The operating method of claim 12, wherein the storing includes:

determining whether to perform a pre-fetch operation;

when a result of the determining whether to perform a pre-fetch operation indicates to perform the pre-fetch operation, loading the data from the NVM device into the cache memory; and storing the source type of the data loaded from the NVM device as a second type.

15. The operating method of claim 12, wherein the determining includes:

receiving a read request from an external host device;

determining whether data corresponding to the read request is stored in the cache memory;

when a cache hit occurs, determining the source type of the data corresponding to the cache hit; and updating the hit count corresponding to the determined source type.

16. The operating method of claim 12, wherein the cache policy includes a first cache policy and a second cache policy, the first cache policy includes a first victim selection method and a first pre-fetch size, and the second cache policy includes a second victim selection method and a second pre-fetch size.

17. The operating method of claim 16, wherein the first victim selection method refers to a method of selecting one of entries in which a cache hit occurred as a victim entry, and the second victim selection method refers to a method of selecting one of entries in which no cache hit occurred as a victim entry.

18. The operating method of claim 16, wherein the mode includes a first mode and a second mode, and the performing the cache policy includes, in the first mode, performing a pre-fetch operation based on the first pre-fetch size, and in the second mode, performing the pre-fetch operation based on the second pre-fetch size that is different from the first pre-fetch size.

19. A storage device comprising:

a non-volatile memory (NVM) device; and a storage controller configured to control the NVM device, wherein the storage controller comprises, a cache memory, and a cache manager configured to read data from the NVM device, store the data and a source type of the data when in the cache memory, the storage controller is configured to, when a cache hit occurs, determine a source type of data corresponding to the cache hit, update a hit count corresponding to the determined source type among a plurality of hit counts, and the storage controller is configured to, determine a dominant source type with a dominant hit rate among a plurality of source types based on the plurality of hit counts, and operate in a mode corresponding to the dominant source type.

20. The storage device of claim 19, wherein the plurality of source types include:

a first type indicating a type of data loaded by an input/output request received from an external host device, and a second type indicating a type of data loaded by a pre-fetch operation.

* * * * *